US012506400B2

(12) United States Patent
Matsuura

(10) Patent No.: US 12,506,400 B2
(45) Date of Patent: Dec. 23, 2025

(54) MAGNETIC COMPONENT, POWER CONVERSION APPARATUS, AND POWER CONVERSION SYSTEM

(71) Applicant: TDK CORPORATION, Tokyo (JP)

(72) Inventor: Ken Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 786 days.

(21) Appl. No.: 17/908,149

(22) PCT Filed: Jan. 29, 2021

(86) PCT No.: PCT/JP2021/003362
§ 371 (c)(1),
(2) Date: Aug. 30, 2022

(87) PCT Pub. No.: WO2021/192609
PCT Pub. Date: Sep. 30, 2021

(65) Prior Publication Data

US 2023/0125248 A1 Apr. 27, 2023

(30) Foreign Application Priority Data

Mar. 24, 2020 (JP) ................................ 2020-052502

(51) Int. Cl.
*H01F 27/28* (2006.01)
*H01F 3/10* (2006.01)
(Continued)

(52) U.S. Cl.
CPC ............ *H02M 1/0064* (2021.05); *H01F 3/10* (2013.01); *H01F 27/22* (2013.01); *H01F 27/263* (2013.01);
(Continued)

(58) Field of Classification Search
CPC .. H02M 1/0064; H02M 3/01; H02M 3/33571; H02M 3/003; H01F 3/10;
(Continued)

(56) References Cited

U.S. PATENT DOCUMENTS 6,867,678 B2 * 3/2005 Yang .................. H01F 27/2804
336/200
10,790,081 B2 * 9/2020 Fei ...................... H01F 27/2804
(Continued)

FOREIGN PATENT DOCUMENTS

JP 2014-063856 A 4/2014

OTHER PUBLICATIONS

Apr. 13, 2021 International Search Report issued in Patent Application No. PCT/JP2021/003362.

*Primary Examiner* — Mang Tin Bik Lian
(74) *Attorney, Agent, or Firm* — Oliff PLC

(57) ABSTRACT

A transformer includes a magnetic core, a first coupling terminal, a second coupling terminal, a first winding, and one or multiple second windings. The magnetic core includes two opposed base parts, and five leg parts including first to fifth leg parts disposed within opposed surfaces of the base parts and magnetically coupling the base parts. The second and third leg parts are disposed with the first leg part interposed therebetween in a first direction. The fourth and fifth leg parts are disposed with the first leg part interposed therebetween in a second direction. The first winding is, in a direction from the first coupling terminal to the second coupling terminal, wound around the first to third leg parts in a first winding direction, and around the fourth and fifth leg parts in a second winding direction. The second winding/windings is/are wound around the leg parts except the first leg part.

16 Claims, 26 Drawing Sheets

(51) Int. Cl.
*H01F 27/22* (2006.01)
*H01F 27/24* (2006.01)
*H01F 27/26* (2006.01)
*H02M 1/00* (2006.01)

(52) U.S. Cl.
CPC ... *H01F 27/2823* (2013.01); *H01F 2003/103* (2013.01)

(58) Field of Classification Search
CPC .... H01F 27/22; H01F 27/263; H01F 27/2823; H01F 2003/103; H01F 27/38; H01F 27/40; H01F 2017/0073; H01F 27/24; H01F 27/2804; H01F 2027/2809; H01F 2027/2814; H01F 2027/2819; Y02B 70/10
See application file for complete search history.

(56) References Cited

U.S. PATENT DOCUMENTS

| | | | | |
|---|---|---|---|---|
| 10,847,297 | B1 * | 11/2020 | Hsu | H01F 27/245 |
| 2010/0232181 | A1 * | 9/2010 | Nakahori | H01F 27/2804 336/221 |
| 2017/0330678 | A1 * | 11/2017 | Harrison | H01F 3/10 |
| 2017/0345541 | A1 | 11/2017 | Yang et al. | |
| 2018/0226182 | A1 * | 8/2018 | Fe | H01F 27/245 |
| 2019/0043660 | A1 * | 2/2019 | Jin | H02M 3/33592 |
| 2020/0350117 | A1 * | 11/2020 | Nabih | H01F 27/40 |
| 2020/0395164 | A1 * | 12/2020 | Ahmed | H01F 27/2804 |
| 2021/0366650 | A1 * | 11/2021 | Lu | H02M 3/1586 |

* cited by examiner

[ FIG. 3 ]
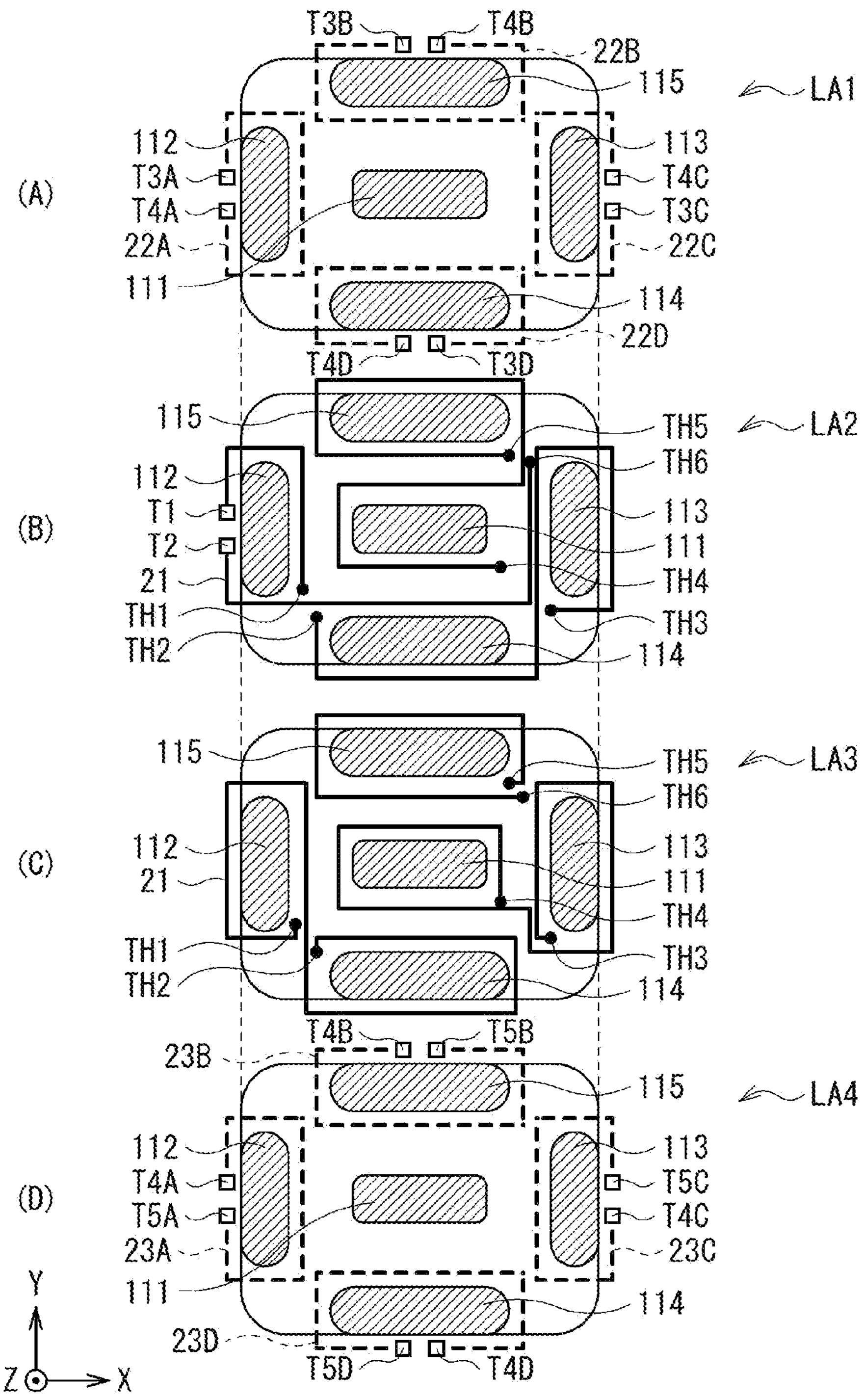

[ FIG. 4 ]
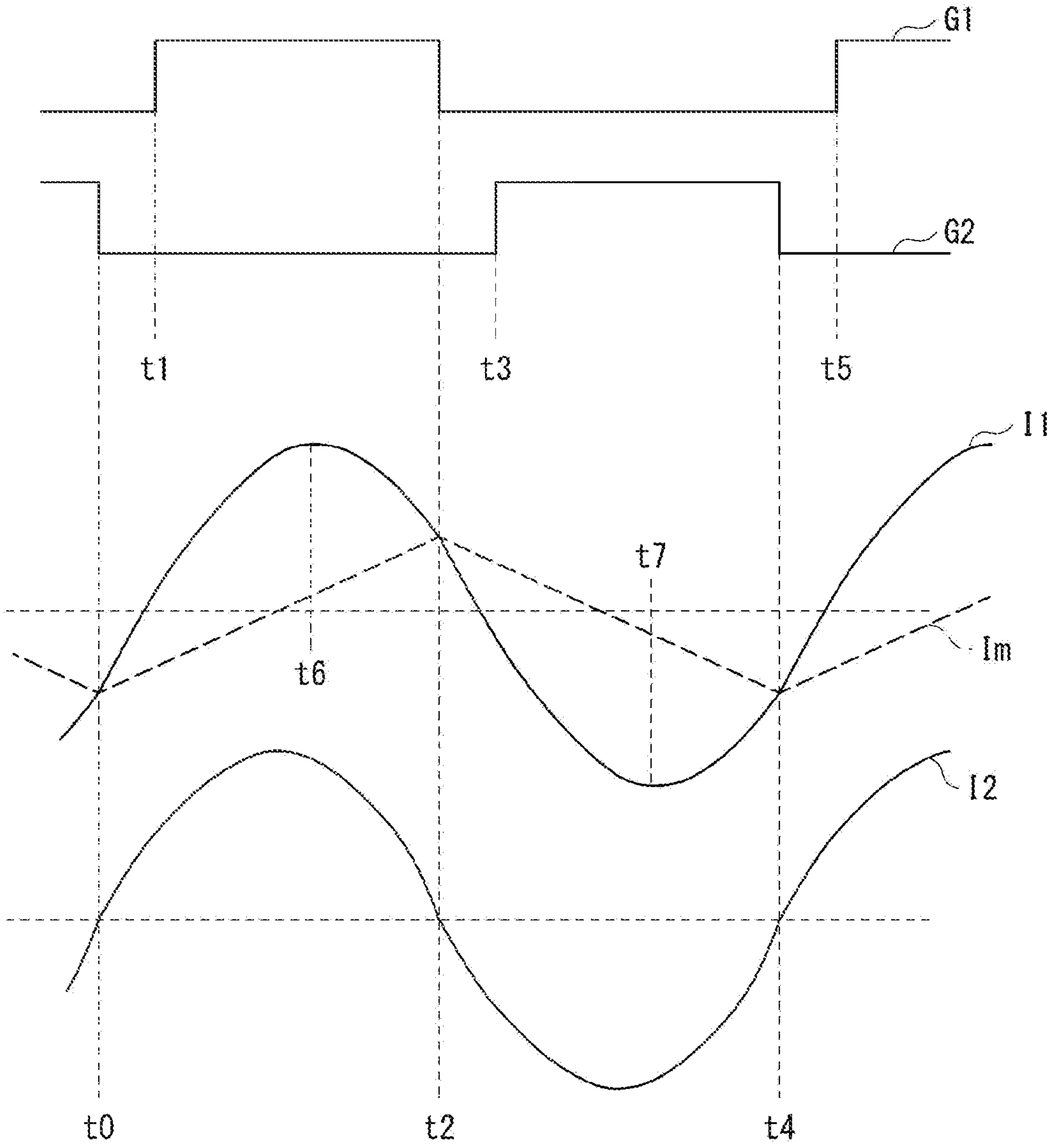

[ FIG. 6A ]
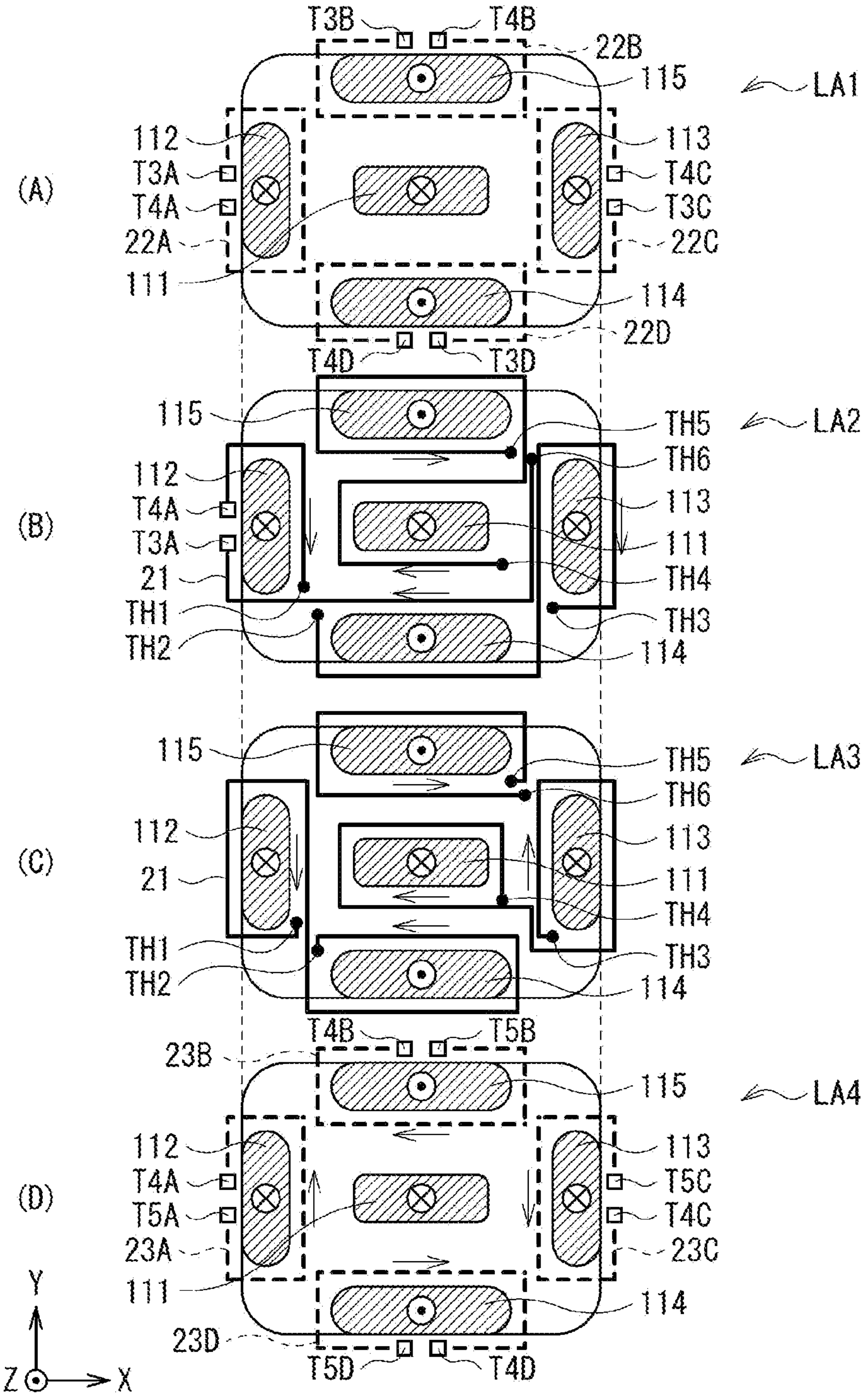

[ FIG. 6B ]
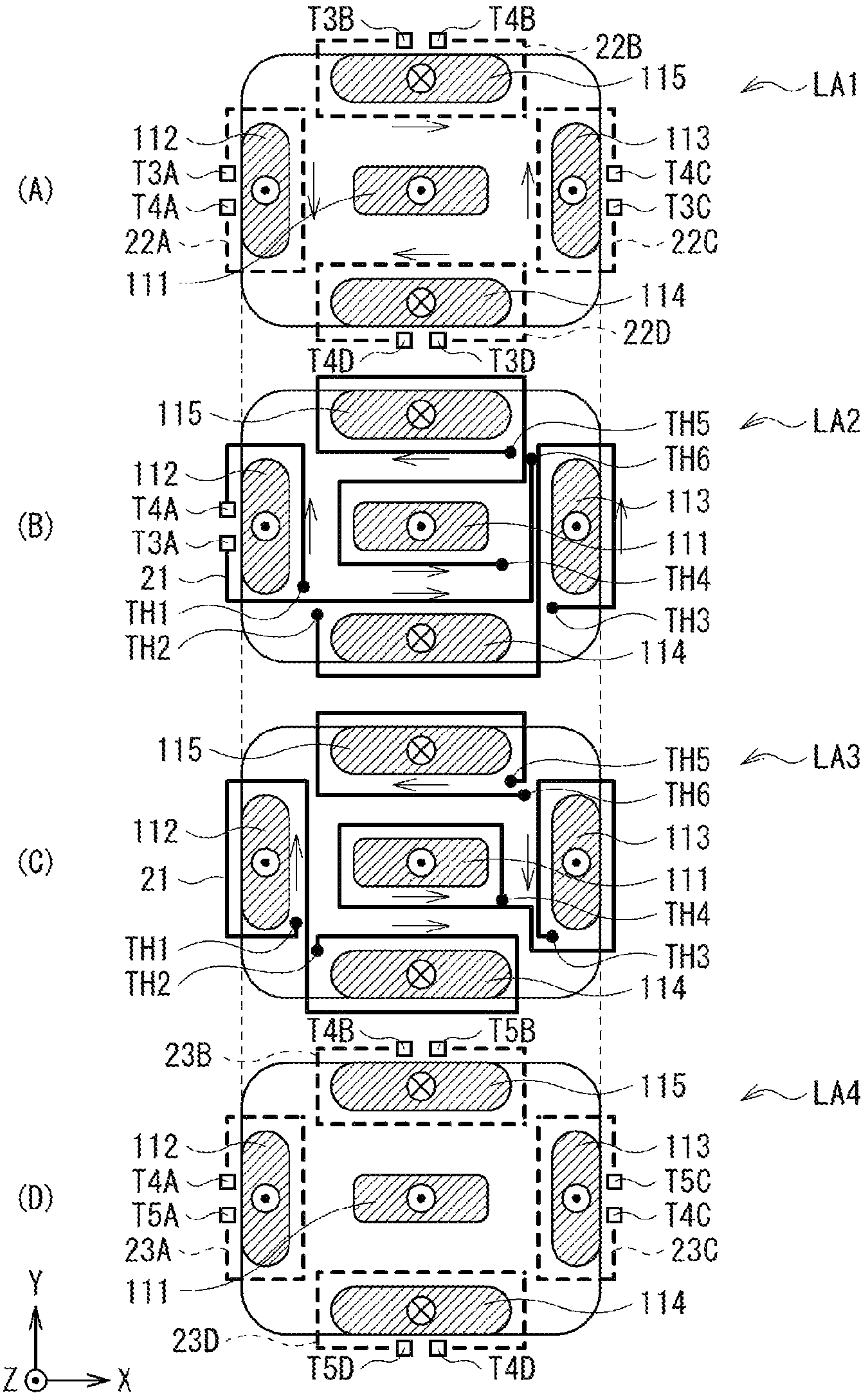

[ FIG. 7A ]
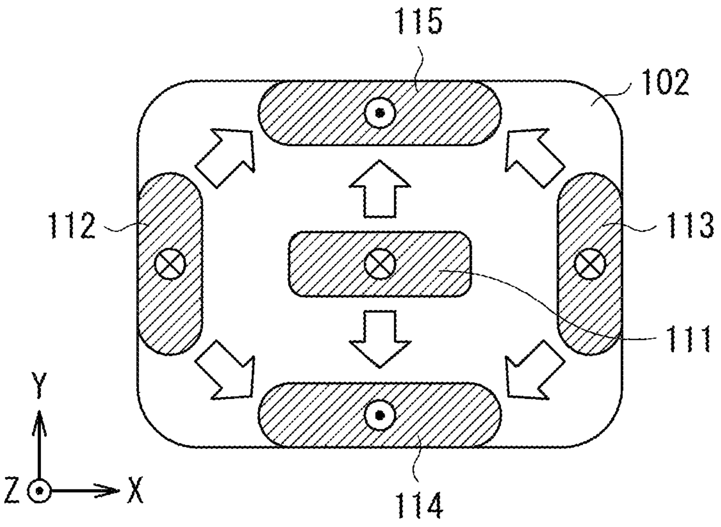
[ FIG. 7B ]
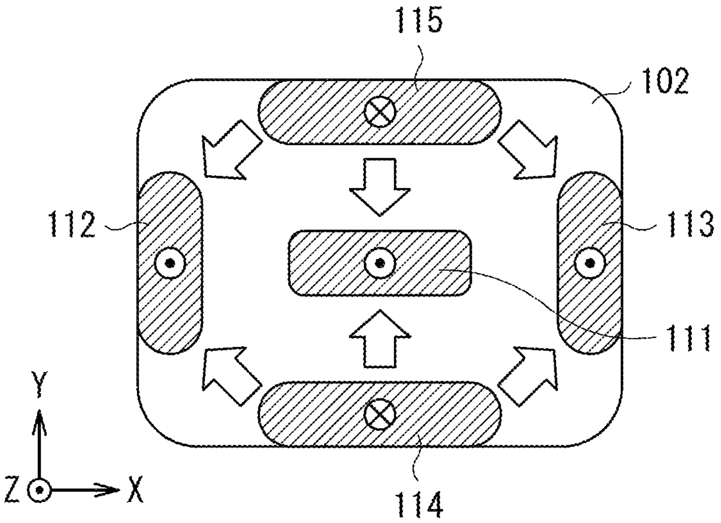

[ FIG. 9 ]

[ FIG. 11 ]
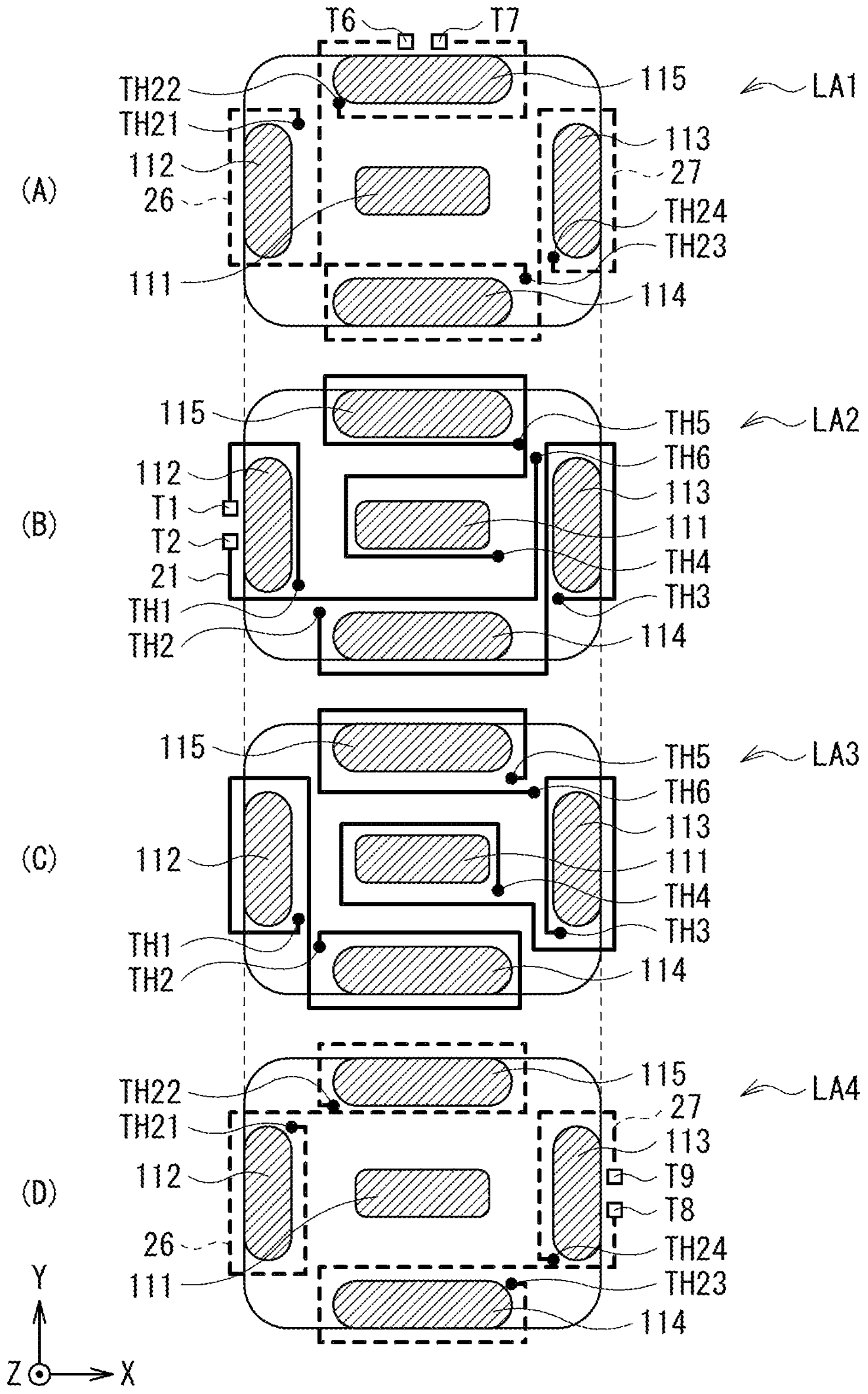

[ FIG. 12 ]
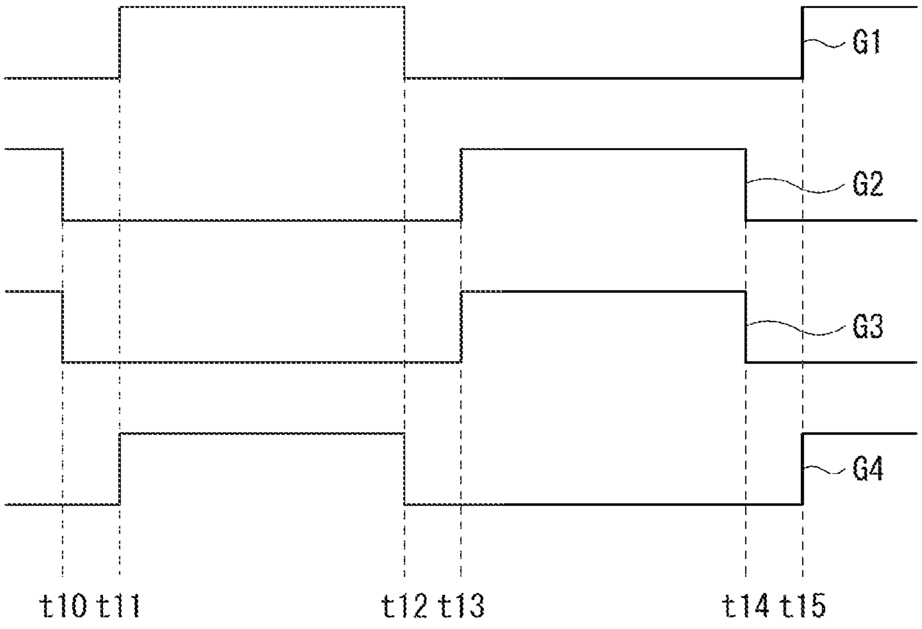

[ FIG. 15 ]

[ FIG. 18 ]
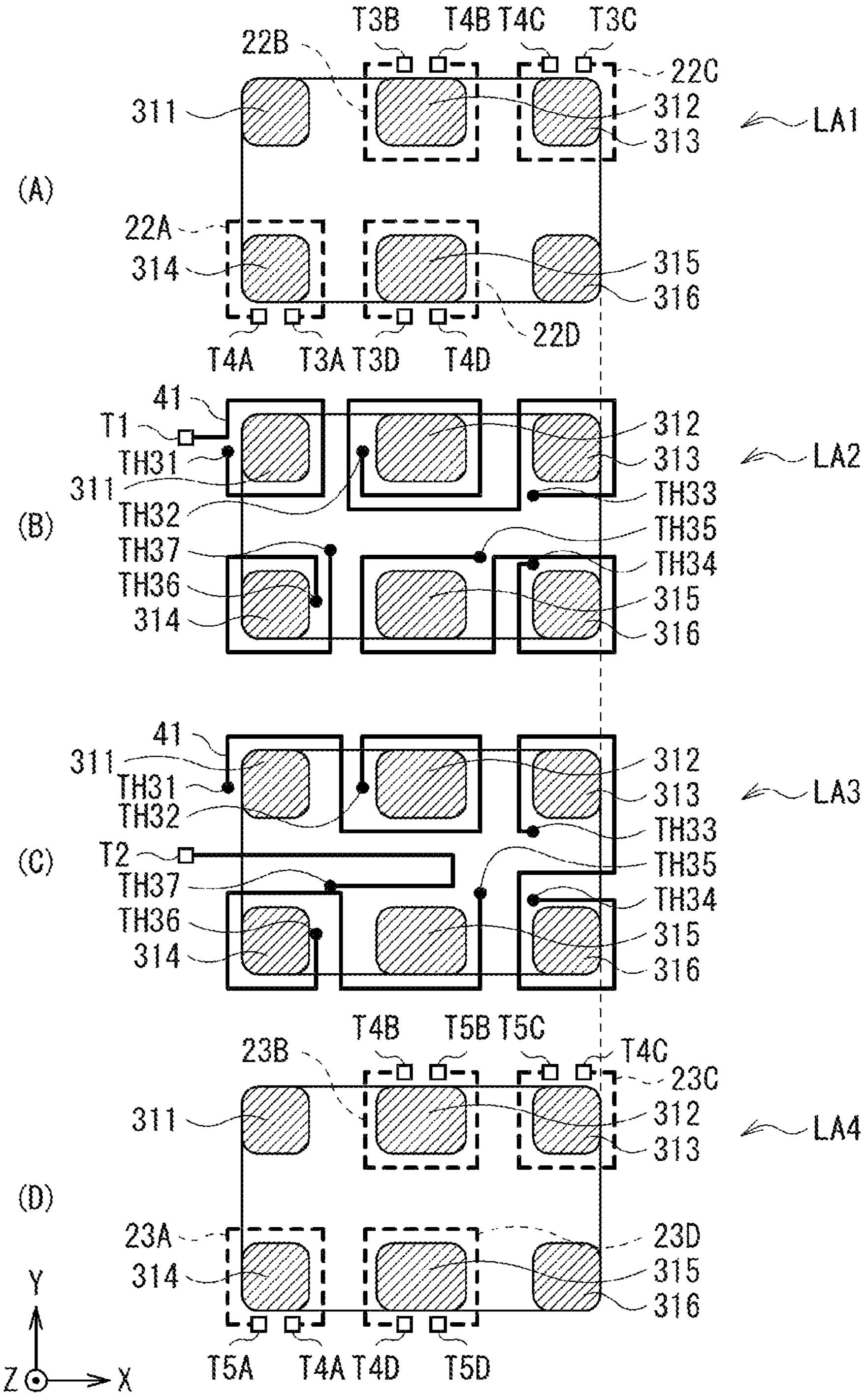

[ FIG. 19A ]
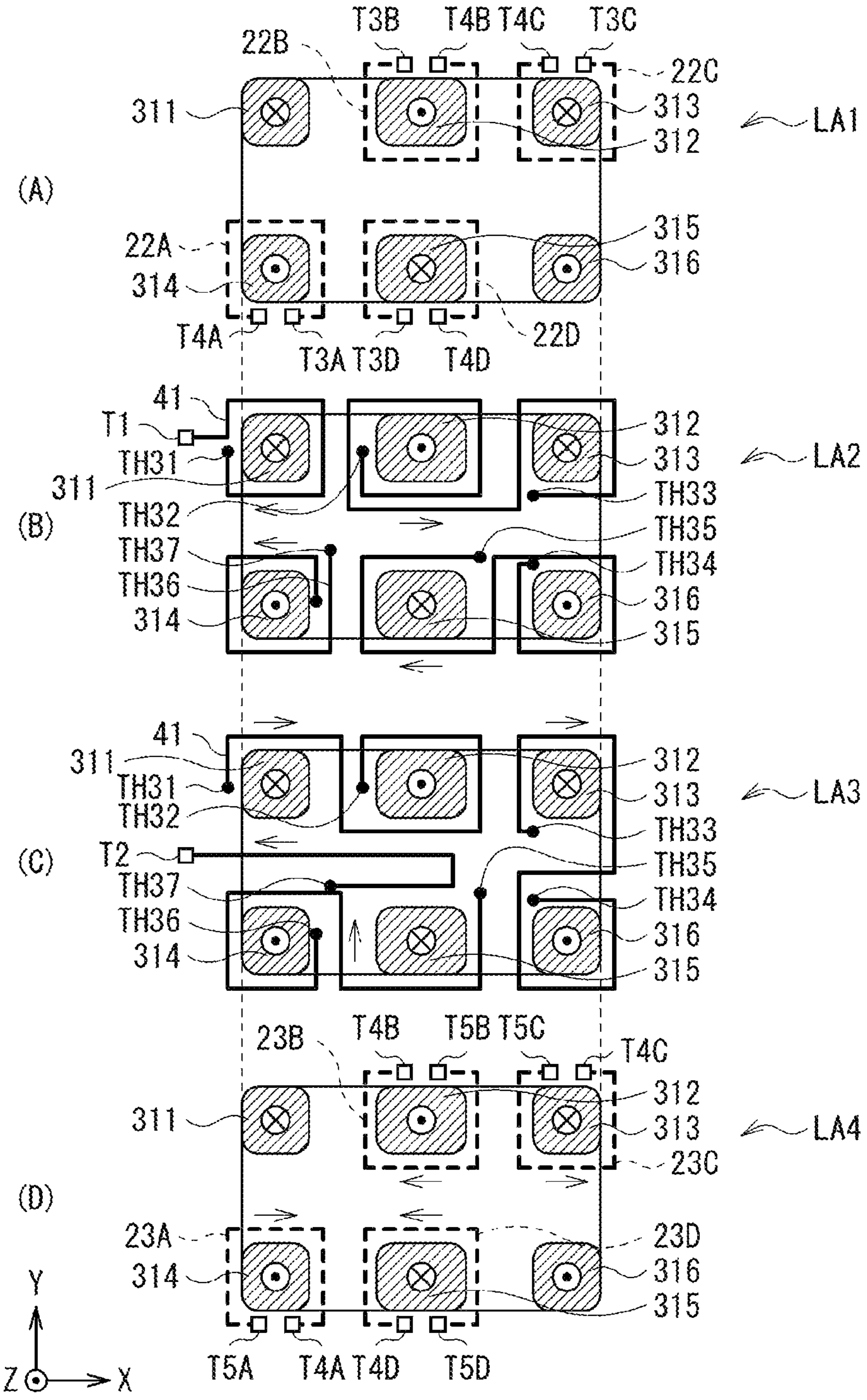

[ FIG. 19B ]
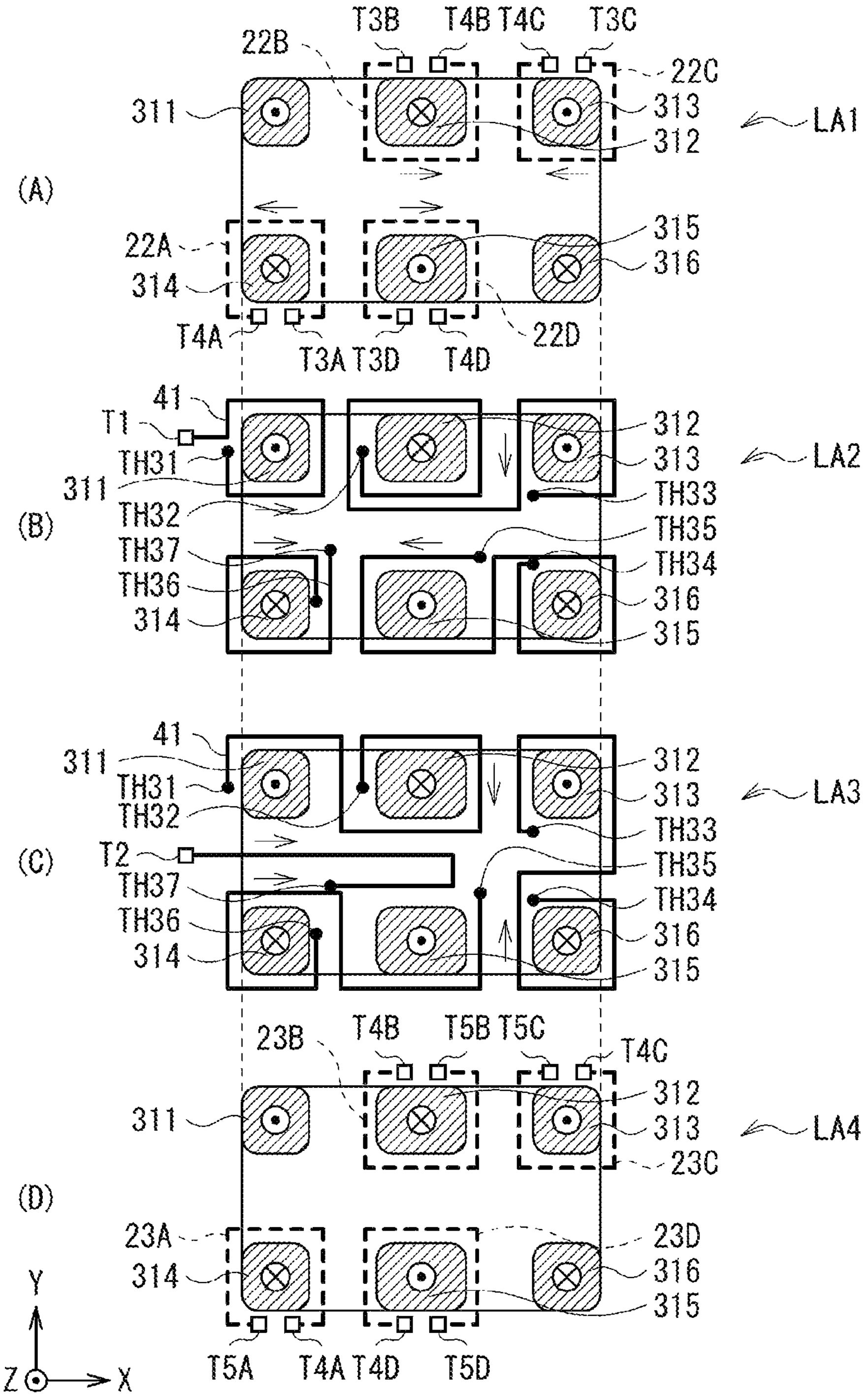

[ FIG. 20A ]
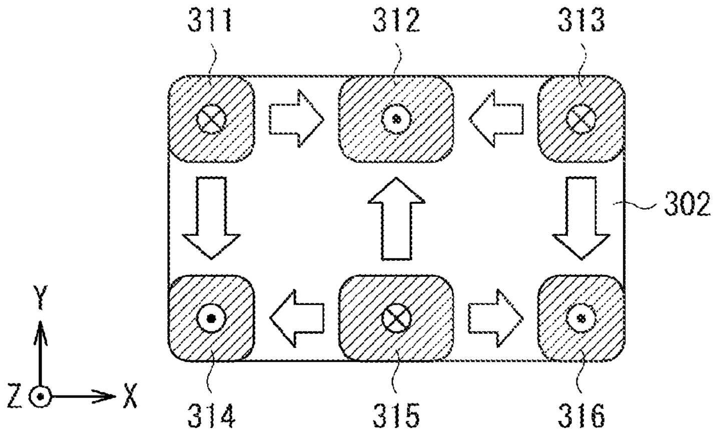
[ FIG. 20B ]
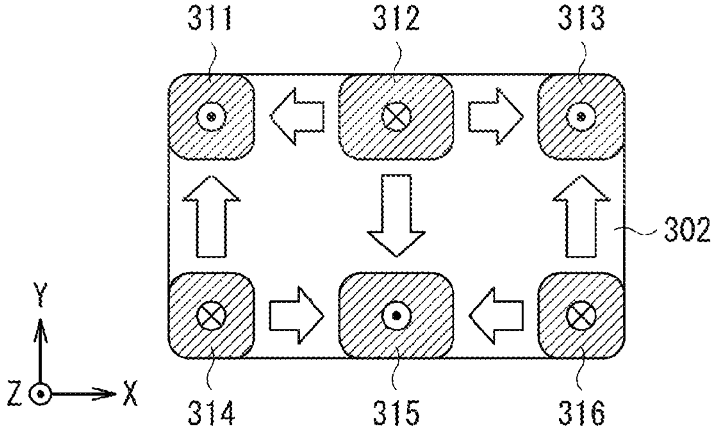

[ FIG. 21 ]
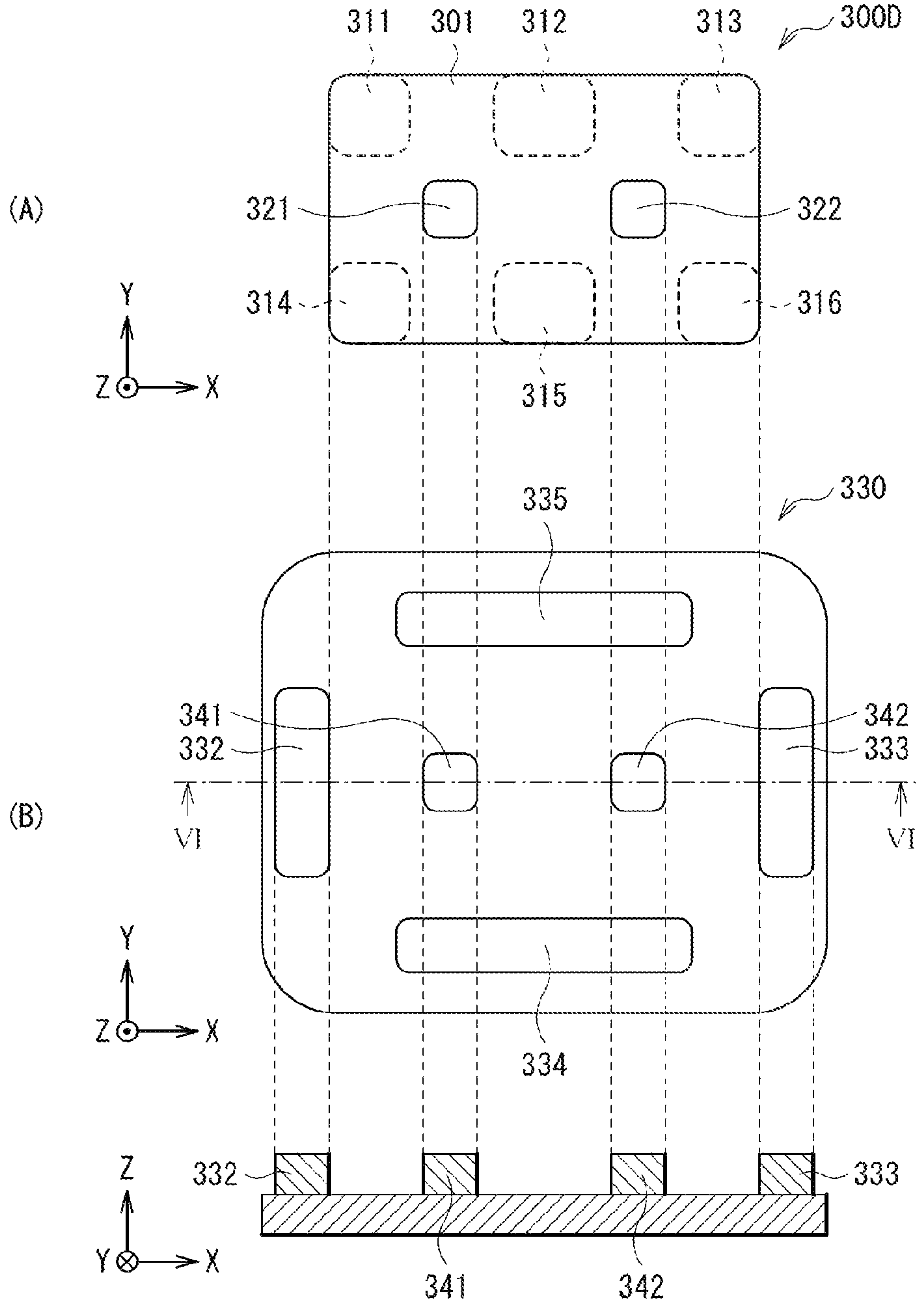

MAGNETIC COMPONENT, POWER CONVERSION APPARATUS, AND POWER CONVERSION SYSTEM

TECHNICAL FIELD

The technology relates to a magnetic component, a power conversion apparatus including the magnetic component, and a power conversion system including such a power conversion apparatus.

BACKGROUND ART

Power conversion apparatuses include resonant converters each configured using a resonant coil and a transformer. It is desired that the power conversion apparatuses be reduced in component cost and implementation cost, and achieve reduction in apparatus size. Based upon such demands, for example, a magnetic component has been developed in which a resonant coil and a transformer are combined (see, for example, Patent Literatures 1 and 2).

CITATION LIST

Patent Literature

Patent Literature 1: Japanese Unexamined Patent Application Publication No. 2014-63856

Patent Literature 2: U.S. Patent Application Publication No. 2017/0345541

SUMMARY

One of power conversion apparatuses is an LLC resonant converter. The LLC resonant converter uses frequency control to stabilize an output voltage. Such frequency control involves applying a large voltage to a resonant coil to allow for operation over a wide input voltage range. This increases a magnetic flux at a magnetic core of the resonant coil, thus making it necessary to increase an effective cross-sectional area of the core. Further, as it is necessary for the resonant coil to be large in inductance, the coil part has to be large in volume. This results in an increase in size of the resonant coil. In the power conversion apparatus, the volumes of the resonant coil and the transformer make up a relatively large proportion of the volume of the apparatus. Accordingly, it is desired to reduce the profile of magnetic components, including the resonant coil and the transformer, to thereby achieve a size reduction thereof.

It is desirable to provide a magnetic component, a power conversion apparatus, and a power conversion system that each make it possible to achieve a size reduction.

A magnetic component according to one embodiment of the technology includes a magnetic core, a first coupling terminal, a second coupling terminal, a first winding, and one or multiple second windings. The magnetic core includes two base parts opposed to each other, and five leg parts disposed within opposed surfaces of the two base parts and magnetically coupling the two base parts. The five leg parts include a first leg part, a second leg part, a third leg part, a fourth leg part, and a fifth leg part. The second leg part and the third leg part are disposed with the first leg part interposed therebetween in a first direction. The fourth leg part and the fifth leg part are disposed with the first leg part interposed therebetween in a second direction. The first winding is, in a direction from the first coupling terminal to the second coupling terminal, wound around the first leg part, the second leg part, and the third leg part in a first winding direction, and around the fourth leg part and the fifth leg part in a second winding direction. The one or multiple second windings are wound around four of the five leg parts other than the first leg part.

A power conversion apparatus according to one embodiment of the technology includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and five leg parts disposed within opposed surfaces of the two base parts and magnetically coupling the two base parts. The five leg parts include a first leg part, a second leg part, a third leg part, a fourth leg part, and a fifth leg part. The second leg part and the third leg part are disposed with the first leg part interposed therebetween in a first direction. The fourth leg part and the fifth leg part are disposed with the first leg part interposed therebetween in a second direction. The first winding is, in a direction from the first coupling terminal to the second coupling terminal, wound around the first leg part, the second leg part, and the third leg part in a first winding direction, and around the fourth leg part and the fifth leg part in a second winding direction. The one or multiple second windings are wound around four of the five leg parts other than the first leg part. The switching circuit is coupled to at least one of the first coupling terminal or the second coupling terminal of the magnetic component, and includes one or multiple switching devices. The rectifying circuit is coupled to the one or multiple second windings of the magnetic component. The smoothing circuit is coupled to the rectifying circuit.

A power conversion apparatus according to one embodiment of the technology includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and five leg parts disposed within opposed surfaces of the two base parts and magnetically coupling the two base parts. The five leg parts include a first leg part, a second leg part, a third leg part, a fourth leg part, and a fifth leg part. The second leg part and the third leg part are disposed with the first leg part interposed therebetween in a first direction. The fourth leg part and the fifth leg part are disposed with the first leg part interposed therebetween in a second direction. The first winding is, in a direction from the first coupling terminal to the second coupling terminal, wound around the first leg part, the second leg part, and the third leg part in a first winding direction, and around the fourth leg part and the fifth leg part in a second winding direction. The one or multiple second windings are wound around four of the five leg parts other than the first leg part. The switching circuit is coupled to the one or multiple second windings of the magnetic component, and includes one or multiple switching devices. The rectifying circuit is coupled to the first coupling terminal and the second coupling terminal of the magnetic component. The smoothing circuit is coupled to the rectifying circuit.

A power conversion system according to one embodiment of the technology includes a power conversion apparatus, a first battery, and a second battery. The power conversion apparatus includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and five leg parts disposed within opposed surfaces of the two base parts and magnetically coupling the two base parts. The five leg parts include a first leg part, a second leg part, a third leg part, a fourth leg part, and a fifth leg part. The second leg part and the third leg part are disposed with the first leg part interposed therebetween in a first direction. The fourth leg part and the fifth leg part are disposed with the first leg part interposed therebetween in a second direction. The first winding is, in a direction from the first coupling terminal to the second coupling terminal, wound around the first leg part, the second leg part, and the third leg part in a first winding direction, and around the fourth leg part and the fifth leg part in a second winding direction. The one or multiple second windings are wound around four of the five leg parts other than the first leg part. The switching circuit is coupled to at least one of the first coupling terminal or the second coupling terminal of the magnetic component, and includes one or multiple switching devices. The rectifying circuit is coupled to the one or multiple second windings of the magnetic component. The smoothing circuit is coupled to the rectifying circuit. The first battery is coupled to the switching circuit of the power conversion apparatus. The second battery is coupled to the smoothing circuit of the power conversion apparatus.

A power conversion system according to one embodiment of the technology includes a power conversion apparatus, a first battery, and a second battery. The power conversion apparatus includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and five leg parts disposed within opposed surfaces of the two base parts and magnetically coupling the two base parts. The five leg parts include a first leg part, a second leg part, a third leg part, a fourth leg part, and a fifth leg part. The second leg part and the third leg part are disposed with the first leg part interposed therebetween in a first direction. The fourth leg part and the fifth leg part are disposed with the first leg part interposed therebetween in a second direction. The first winding is, in a direction from the first coupling terminal to the second coupling terminal, wound around the first leg part, the second leg part, and the third leg part in a first winding direction, and around the fourth leg part and the fifth leg part in a second winding direction. The one or multiple second windings are wound around four of the five leg parts other than the first leg part. The switching circuit is coupled to the one or multiple second windings of the magnetic component, and includes one or multiple switching devices. The rectifying circuit is coupled to the first coupling terminal and the second coupling terminal of the magnetic component. The smoothing circuit is coupled to the rectifying circuit. The first battery is coupled to the switching circuit of the power conversion apparatus. The second battery is coupled to the smoothing circuit of the power conversion apparatus.

A magnetic component according to one embodiment of the technology includes a magnetic core, a first coupling terminal, a second coupling terminal, a first winding, and one or multiple second windings. The magnetic core includes two base parts opposed to each other, and six leg parts disposed within opposed surfaces of the two base parts and magnetically coupling the two base parts. The six leg parts include a first leg part, a second leg part, a third leg part, a fourth leg part, a fifth leg part, and a sixth leg part. The first leg part, the second leg part, and the third leg part are arranged side by side in this order in a first direction. The fourth leg part, the fifth leg part, and the sixth leg part are arranged side by side in this order in the first direction. The first leg part and the fourth leg part are arranged side by side in a second direction. The second leg part and the fifth leg part are arranged side by side in the second direction. The third leg part and the sixth leg part are arranged side by side in the second direction. The first winding is, in a direction from the first coupling terminal to the second coupling terminal, wound around the first leg part, the third leg part, and the fifth leg part in a first winding direction, and around the second leg part, the fourth leg part, and the sixth leg part in a second winding direction. The one or multiple second windings are wound around four of the five leg parts other than the first leg part and the sixth leg part.

A power conversion apparatus according to one embodiment of the technology includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and six leg parts disposed within opposed surfaces of the two base parts and magnetically coupling the two base parts. The six leg parts include a first leg part, a second leg part, a third leg part, a fourth leg part, a fifth leg part, and a sixth leg part. The first leg part, the second leg part, and the third leg part are arranged side by side in this order in a first direction. The fourth leg part, the fifth leg part, and the sixth leg part are arranged side by side in this order in the first direction. The first leg part and the fourth leg part are arranged side by side in a second direction. The second leg part and the fifth leg part are arranged side by side in the second direction. The third leg part and the sixth leg part are arranged side by side in the second direction. The first winding is, in a direction from the first coupling terminal to the second coupling terminal, wound around the first leg part, the third leg part, and the fifth leg part in a first winding direction, and around the second leg part, the fourth leg part, and the sixth leg part in a second winding direction. The one or multiple second windings are wound around four of the five leg parts other than the first leg part and the sixth leg part. The switching circuit is coupled to at least one of the first coupling terminal or the second coupling terminal of the magnetic component, and includes one or multiple switching devices. The rectifying circuit is coupled to the one or multiple second windings of the magnetic component. The smoothing circuit is coupled to the rectifying circuit.

A power conversion apparatus according to one embodiment of the technology includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and six leg parts disposed within opposed surfaces of the two base parts and magnetically coupling the two base parts. The six leg parts include a first leg part, a second leg part, a third leg part, a fourth leg part, a fifth leg part, and a sixth leg part. The first leg part, the second leg part, and the third leg part are arranged side by side in this order in a first direction. The fourth leg part, the fifth leg part, and the sixth leg part are arranged side by side in this order in the first direction. The first leg part and the fourth leg part are arranged side by side in a second direction. The second leg part and the fifth leg part are arranged side by side in the second direction. The third leg part and the sixth leg part are arranged side by side in the second direction. The first winding is, in a direction from the first coupling terminal to the second coupling terminal, wound around the first leg part, the third leg part, and the fifth leg part in a first winding direction, and around the second leg part, the fourth leg part, and the sixth leg part in a second winding direction. The one or multiple second windings are wound around four of the five leg parts other than the first leg part and the sixth leg part. The switching circuit is coupled to the one or multiple second windings of the magnetic component, and includes one or multiple switching devices. The rectifying circuit is coupled to the first coupling terminal and the second coupling terminal of the magnetic component. The smoothing circuit is coupled to the rectifying circuit.

A power conversion system according to one embodiment of the technology includes a power conversion apparatus, a first battery, and a second battery. The power conversion apparatus includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and six leg parts disposed within opposed surfaces of the two base parts and magnetically coupling the two base parts. The six leg parts include a first leg part, a second leg part, a third leg part, a fourth leg part, a fifth leg part, and a sixth leg part. The first leg part, the second leg part, and the third leg part are arranged side by side in this order in a first direction. The fourth leg part, the fifth leg part, and the sixth leg part are arranged side by side in this order in the first direction. The first leg part and the fourth leg part are arranged side by side in a second direction. The second leg part and the fifth leg part are arranged side by side in the second direction. The third leg part and the sixth leg part are arranged side by side in the second direction. The first winding is, in a direction from the first coupling terminal to the second coupling terminal, wound around the first leg part, the third leg part, and the fifth leg part in a first winding direction, and around the second leg part, the fourth leg part, and the sixth leg part in a second winding direction. The one or multiple second windings are wound around four of the five leg parts other than the first leg part and the sixth leg part. The switching circuit is coupled to at least one of the first coupling terminal or the second coupling terminal of the magnetic component, and includes one or multiple switching devices. The rectifying circuit is coupled to the one or multiple second windings of the magnetic component. The smoothing circuit is coupled to the rectifying circuit. The first battery is coupled to the switching circuit of the power conversion apparatus. The second battery is coupled to the smoothing circuit of the power conversion apparatus.

A power conversion system according to one embodiment of the technology includes a power conversion apparatus, a first battery, and a second battery. The power conversion apparatus includes a magnetic component, a switching circuit, a rectifying circuit, and a smoothing circuit. The magnetic component includes a magnetic core, a first coupling terminal, a second coupling terminal, a first winding, and one or multiple second windings. The magnetic core includes two base parts opposed to each other, and six leg parts disposed within opposed surfaces of the two base parts and magnetically coupling the two base parts. The six leg parts include a first leg part, a second leg part, a third leg part, a fourth leg part, a fifth leg part, and a sixth leg part. The first leg part, the second leg part, and the third leg part are arranged side by side in this order in a first direction. The fourth leg part, the fifth leg part, and the sixth leg part are arranged side by side in this order in the first direction. The first leg part and the fourth leg part are arranged side by side in a second direction. The second leg part and the fifth leg part are arranged side by side in the second direction. The third leg part and the sixth leg part are arranged side by side in the second direction. The first winding is, in a direction from the first coupling terminal to the second coupling terminal, wound around the first leg part, the third leg part, and the fifth leg part in a first winding direction, and around the second leg part, the fourth leg part, and the sixth leg part in a second winding direction. The one or multiple second windings are wound around four of the five leg parts other than the first leg part and the sixth leg part. The switching circuit is coupled to the one or multiple second windings of the magnetic component, and includes one or multiple switching devices. The rectifying circuit is coupled to the first coupling terminal and the second coupling terminal of the magnetic component. The smoothing circuit is coupled to the rectifying circuit. The first battery is coupled to the switching circuit of the power conversion apparatus. The second battery is coupled to the smoothing circuit of the power conversion apparatus.

BRIEF DESCRIPTION OF THE DRAWINGS

FIG. 3 is an explanatory diagram illustrating a configuration example of windings illustrated in FIG. 1.

FIG. 4 is a timing waveform diagram illustrating an operation example of the power conversion apparatus illustrated in FIG. 1.

FIG. 6A is an explanatory diagram illustrating an example of magnetic flux at leg parts illustrated in FIG. 3.

FIG. 6B is an explanatory diagram illustrating another example of magnetic flux at the leg parts illustrated in FIG. 3.

FIG. 7A is an explanatory diagram illustrating an example of magnetic flux at a base part illustrated in FIG. 3.

FIG. 7B is an explanatory diagram illustrating another example of magnetic flux at the base part illustrated in FIG. 3.

FIG. 11 is an explanatory diagram illustrating a configuration example of windings illustrated in FIG. 10.

FIG. 12 is a timing waveform diagram illustrating an operation example of the power conversion apparatus illustrated in FIG. 10.

FIG. 18 is an explanatory diagram illustrating a configuration example of windings illustrated in FIG. 16.

FIG. 19A is an explanatory diagram illustrating an example of magnetic flux at leg parts illustrated in FIG. 18.

FIG. 19B is an explanatory diagram illustrating another example of magnetic flux at the leg parts illustrated in FIG. 18.

FIG. 20A is an explanatory diagram illustrating an example of magnetic flux at a base part illustrated in FIG. 18.

FIG. 20B is an explanatory diagram illustrating another example of magnetic flux at the base part illustrated in FIG. 18.

FIG. 21 is an explanatory diagram illustrating a configuration example of a transformer according to a modification example of one example embodiment of the technology.

DETAILED DESCRIPTION

In the following, a description will be given in detail of example embodiments of the technology with reference to the drawings.

1. First Example Embodiment

Configuration Example

Figure 1:
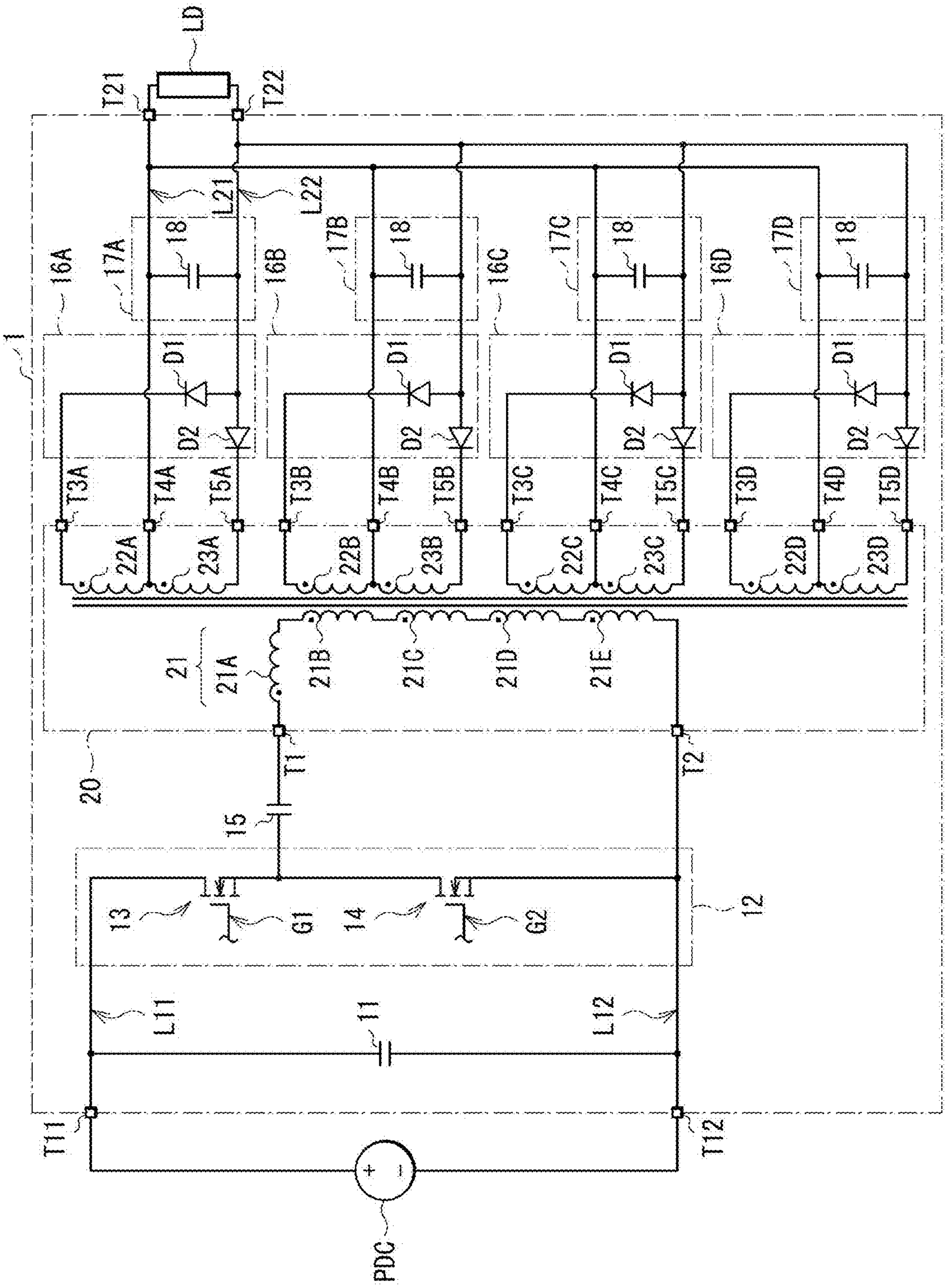
FIG. 1 is a circuit diagram illustrating a configuration example of a power conversion apparatus according to one example embodiment of the technology.

FIG. 1 illustrates a configuration example of a power conversion apparatus 1 including a transformer according to a first example embodiment of the technology. The power conversion apparatus 1 is an LLC resonant converter that transforms direct-current electric power. The power conversion apparatus 1 includes terminals T11 and T12 and terminals T21 and T22. The terminals T11 and T12 are coupled to a direct-current power supply PDC, and the terminals T21 and T22 are coupled to a load LD. The power conversion apparatus 1 is configured to convert direct-current electric power supplied from the direct-current power supply PDC and to supply the converted direct-current electric power to the load LD.

The power conversion apparatus 1 includes a capacitor 11, a switching circuit 12, a capacitor 15, a transformer 20, four rectifying circuits 16 (rectifying circuits 16A, 16B, 16C, and 16D), and four smoothing circuits 17 (smoothing circuits 17A, 17B, 17C, and 17D). The capacitor 11, the switching circuit 12, and the capacitor 15 configure primary-side circuitry of the power conversion apparatus 1. The four rectifying circuits 16 and the four smoothing circuits 17 configure secondary-side circuitry of the power conversion apparatus 1.

The capacitor 11 has one end coupled to a voltage line L11 led to the terminal T11, and another end coupled to a reference voltage line L12 led to the terminal T12.

The switching circuit 12 is configured to convert a direct-current voltage supplied from the direct-current power supply PDC into an alternating-current voltage. The switching circuit 12 includes transistors 13 and 14. The transistors 13 and 14 are metal-oxide-semiconductor field-effect transistors (MOSFETs) in this example. The transistor 13 has a drain coupled to the voltage line L11, a gate receiving a gate signal G1 from an unillustrated controller, and a source coupled to a drain of the transistor 14 and to one end of the capacitor 15. The transistor 14 has the drain coupled to the source of the transistor 13 and to the one end of the capacitor 15, a gate receiving a gate signal G2 from an unillustrated controller, and a source coupled to the reference voltage line L12. Note that the switching circuit 12 is not limited to that having this configuration, and various circuits including one or multiple switching devices are usable as the switching circuit 12.

The capacitor 15 has the one end coupled to the source of the transistor 13 and the drain of the transistor 14, and another end coupled to a coupling terminal T1 (described later) of the transformer 20.

The transformer 20 is configured to: provide direct-current isolation and alternating-current coupling between the primary-side circuitry and the secondary-side circuitry; transform an alternating-current voltage supplied from the primary-side circuitry with a transformation ratio R of the transformer 20; and supply the transformed alternating-current voltage to the secondary-side circuitry. The transformer 20 is a magnetic component in which a resonant coil and a transformer are combined. The transformer 20 includes coupling terminals T1, T2, T3A, T4A, T5A, T3B, T4B, T5B, T3C, T4C, T5C, T3D, T4D, and T5D, a winding 21, and windings 22A, 23A, 22B, 23B, 22C, 23C, 22D, and 23D.

The coupling terminal T1 is coupled to the other end of the capacitor 15, and the coupling terminal T2 is coupled to the reference voltage line L12. The coupling terminals T3A and T5A are coupled via the rectifying circuit 16A to a reference voltage line L22 led to the terminal T22. The coupling terminal T4A is coupled to a reference voltage line L21 led to the terminal T21. The coupling terminals T3B and T5B are coupled to the reference voltage line L22 via the rectifying circuit 16B. The coupling terminal T4B is coupled to the reference voltage line L21. The coupling terminals T3C and T5C are coupled to the reference voltage line L22 via the rectifying circuit 16C. The coupling terminal T4C is coupled to the reference voltage line L21. The coupling terminals T3D and T5D are coupled to the reference voltage line L22 via the rectifying circuit 16D. The coupling terminal T4D is coupled to the reference voltage line L21.

The winding 21 has one end coupled to the coupling terminal T1, and another end coupled to the coupling terminal T2. The winding 21 includes windings 21A, 21B, 21C, 21D, and 21E. The winding 21A constitutes the resonant coil, and the windings 21B to 21E constitute a primary-side winding of the transformer. The windings 21A to 21E are coupled in series in this order. The winding 21A is coupled to the coupling terminal T1, and the winding 21E is coupled to the coupling terminal T2.

The winding 22A has one end coupled to the coupling terminal T3A, and another end coupled to the coupling terminal T4A. The winding 23A has one end coupled to the coupling terminal T4A, and another end coupled to the coupling terminal T5A. The winding 22B has one end coupled to the coupling terminal T3B, and another end coupled to the coupling terminal T4B. The winding 23B has one end coupled to the coupling terminal T4B, and another end coupled to the coupling terminal TSB. The winding 22C has one end coupled to the coupling terminal T3C, and another end coupled to the coupling terminal T4C. The winding 23C has one end coupled to the coupling terminal T4C, and another end coupled to the coupling terminal TSC. The winding 22D has one end coupled to the coupling terminal T3D, and another end coupled to the coupling terminal T4D. The winding 23D has one end coupled to the coupling terminal T4D, and another end coupled to the coupling terminal TSD.

The rectifying circuit 16A is configured to rectify an alternating-current voltage outputted from the windings 22A and 23A of the transformer 20. The rectifying circuit 16A includes diodes D1 and D2. The diode D1 is provided on the reference voltage line L22, and has an anode coupled to an anode of the diode D2 and to the smoothing circuit 17A, and a cathode coupled to the coupling terminal T3A of the transformer 20. The diode D2 is provided on the reference voltage line L22, and has the anode coupled to the anode of the diode D1 and to the smoothing circuit 17A, and a cathode coupled to the coupling terminal T5A of the transformer 20. Note that although the diodes are provided in this example, this is non-limiting. Instead of the diodes, for example, transistors may be provided to perform so-called synchronous rectification.

The rectifying circuit 16B is configured to rectify an alternating-current voltage outputted from the windings 22B and 23B of the transformer 20. The rectifying circuit 16C is configured to rectify an alternating-current voltage outputted from the windings 22C and 23C of the transformer 20. The rectifying circuit 16D is configured to rectify an alternating-current voltage outputted from the windings 22D and 23D of the transformer 20. The rectifying circuits 16B to 16D each have a circuit configuration similar to a circuit configuration of the rectifying circuit 16A.

The smoothing circuit 17A is configured to smooth the voltage rectified by the rectifying circuit 16A. The smoothing circuit 17A includes a capacitor 18. The capacitor 18 has one end coupled to the voltage line L21, and another end coupled to the reference voltage line L22. Note that although the smoothing circuit 17A includes the capacitor 18 in this example, this is non-limiting. For example, the smoothing circuit 17A may further include an inductor provided between the one end of the capacitor 18 and the coupling terminal T4A of the transformer 20.

The smoothing circuit 17B is configured to smooth the voltage rectified by the rectifying circuit 16B. The smoothing circuit 17C is configured to smooth the voltage rectified by the rectifying circuit 16C. The smoothing circuit 17D is configured to smooth the voltage rectified by the rectifying circuit 16D. The smoothing circuits 17B to 17D each have a circuit configuration similar to a circuit configuration of the smoothing circuit 17A.

(Transformer 20)

Figure 2:
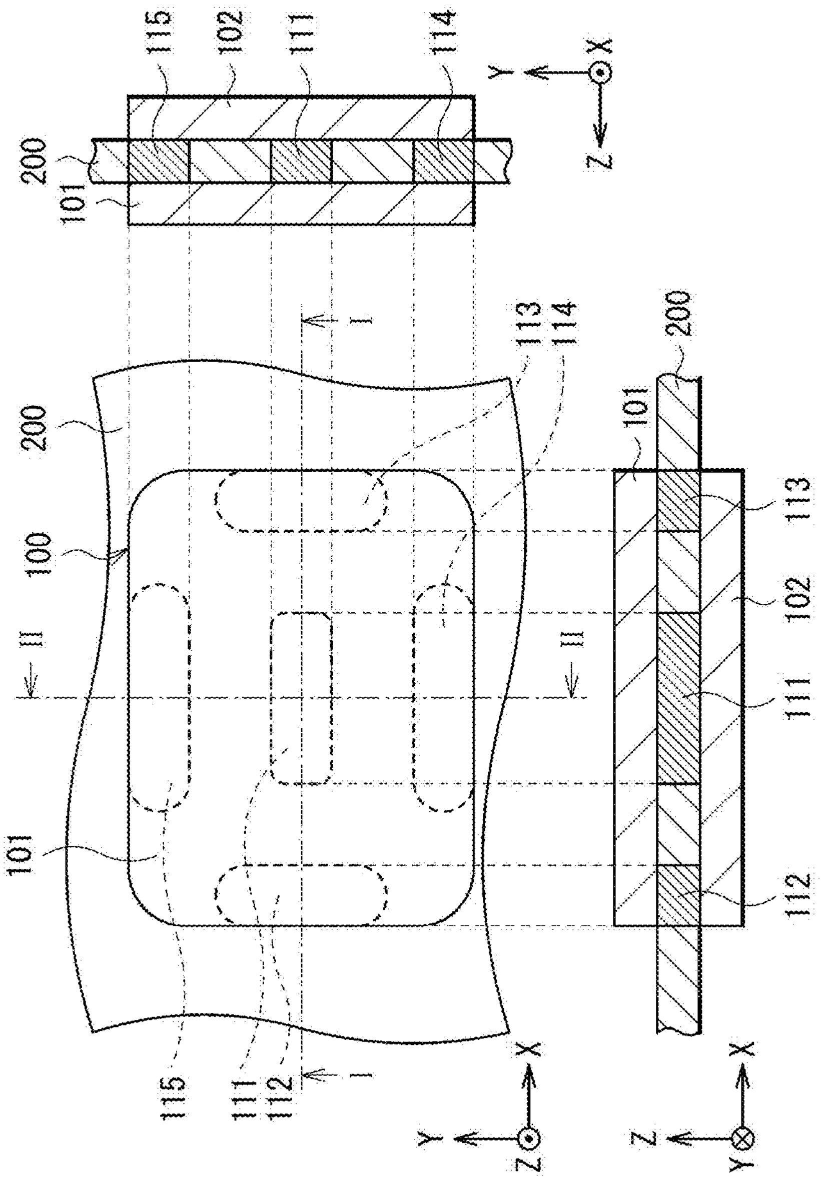
FIG. 2 is an explanatory diagram illustrating a configuration example of a transformer illustrated in FIG. 1.

FIG. 2 illustrates a configuration example of the transformer 20. FIG. 2 also illustrates a cross section of the transformer 20 as viewed in a direction of arrows I-I and a cross section of the transformer 20 as viewed in a direction of arrows II-II. The transformer 20 is a planar transformer in this example. The transformer 20 includes a magnetic core 100 and a substrate 200.

The magnetic core 100 includes base parts 101 and 102 and five leg parts 111 to 115. The base parts 101 and 102 are disposed to be opposed to each other in a Z direction. The base parts 101 and 102 each have a generally rectangular shape that is long in an X direction in an XY plane. The leg parts 111 to 115 are disposed within opposed surfaces of the two base parts 101 and 102 and are provided to magnetically couple the two base parts 101 and 102. The leg part 111 is provided in the vicinity of middle portions of the base parts 101 and 102. The leg parts 112 and 113 are provided on respective opposite end portions of each of the base parts 101 and 102 in the X direction. The leg parts 114 and 115 are provided on respective opposite end portions of each of the base parts 101 and 102 in a Y direction. In other words, the leg parts 112 and 113 are disposed with the leg part 111 interposed therebetween in the X direction, and the leg parts 114 and 115 are disposed with the leg part 111 interposed therebetween in the Y direction. In the XY plane, the leg parts 114 and 115 have cross-sectional areas greater than cross-sectional areas of the leg parts 112 and 113. The leg parts 111, 114, and 115 are configured to be long in the X direction in the XY plane. The leg parts 112 and 113 are configured to be long in the Y direction in the XY plane. The leg parts 114 and 115 have widths in the X direction greater than widths of the leg parts 112 and 113 in the Y direction.

The substrate 200 is a multilayer substrate (a four-layer substrate in this example). The substrate 200 is provided with penetrating holes at positions corresponding to the leg parts 111 to 115 of the magnetic core 100. The substrate 200 is interposed between the base parts 101 and 102 of the magnetic core 100. The substrate 200 is provided with the winding 21 and the windings 22A, 23A, 22B, 23B, 22C, 23C, 22D, and 23D.

FIG. 3 illustrates a configuration example of the windings at the substrate 200. Part (A) of FIG. 3 illustrates a wiring layer LA1 which is a first layer. Part (B) of FIG. 3 illustrates a wiring layer LA2 which is a second layer. Part (C) of FIG. 3 illustrates a wiring layer LA3 which is a third layer. Part (D) of FIG. 3 illustrates a wiring layer LA4 which is a fourth layer. The wiring layers LA1 to LA4 are provided in this order in a layered direction of the substrate 200. In FIG. 3, the winding 21 is illustrated in solid lines, and the windings 22A, 23A, 22B, 23B, 22C, 23C, 22D, and 23D are illustrated in broken lines.

The wiring layers LA2 and LA3 are each provided with the winding 21 (the windings 21A, 21B, 21C, 21D, and 21E). The substrate 200 is provided with through holes TH1 to TH6 coupling a wiring line of the wiring layer LA2 and a wiring line of the wiring layer LA3. The winding 21 includes these through holes TH1 to TH6 and is coupled to the coupling terminals T1 and T2. The winding 21 is wound around the five leg parts 111 to 115. Specifically, in the direction from the coupling terminal T1 to the coupling terminal T2, the winding 21 is wound clockwise twice around each of the leg parts 111, 112, and 113, and counterclockwise twice around each of the leg parts 114 and 115. A portion of the winding 21 that is wound around the leg part 111 corresponds to the winding 21A which constitutes the resonant coil, and portions of the winding 21 that are wound around the leg parts 112 to 115 correspond to the windings 21B to 21D which constitute the primary-side winding of the transformer.

The wiring layer LA1 is provided with the windings 22A, 22B, 22C, and 22D. In a direction from the coupling terminal T3A to the coupling terminal T4A, the winding 22A is wound clockwise once around the leg part 112. In a direction from the coupling terminal T3B to the coupling terminal T4B, the winding 22B is wound counterclockwise once around the leg part 115. In a direction from the coupling terminal T3C to the coupling terminal T4C, the winding 22C is wound clockwise once around the leg part 113. In a direction from the coupling terminal T3D to the coupling terminal T4D, the winding 22D is wound counterclockwise once around the leg part 114.

The wiring layer LA4 is provided with the windings 23A, 23B, 23C, and 23D. In a direction from the coupling terminal T5A to the coupling terminal T4A, the winding 23A is wound counterclockwise once around the leg part 112. In a direction from the coupling terminal TSB to the coupling terminal T4B, the winding 23B is wound clockwise once around the leg part 115. In a direction from the coupling terminal T5C to the coupling terminal T4C, the winding 23C is wound counterclockwise once around the leg part 113. In a direction from the coupling terminal T5D to the coupling terminal T4D, the winding 23D is wound clockwise once around the leg part 114.

Here, the transformer 20 corresponds to a specific example of a "magnetic component" in one embodiment of the disclosure. The magnetic core 100 corresponds to a specific example of a "magnetic core" in one embodiment of the disclosure. The leg part 111 corresponds to a specific example of a "first leg part" in one embodiment of the disclosure. The leg part 112 corresponds to a specific example of a "second leg part" in one embodiment of the disclosure. The leg part 113 corresponds to a specific example of a "third leg part" in one embodiment of the disclosure. The leg part 114 corresponds to a specific example of a "fourth leg part" in one embodiment of the disclosure. The leg part 115 corresponds to a specific example of a "fifth leg part" in one embodiment of the disclosure. The coupling terminal T1 corresponds to a specific example of a "first coupling terminal" in one embodiment of the disclosure. The coupling terminal T2 corresponds to a specific example of a "second coupling terminal" in one embodiment of the disclosure. The winding 21 corresponds to a specific example of a "first winding" in one embodiment of the disclosure. The windings 22A, 23A, 22B, 23B, 22C, 23C, 22D, and 23D correspond to a specific example of "multiple second windings" in one embodiment of the disclosure. The switching circuit 12 corresponds to a specific example of a "switching circuit" in one embodiment of the disclosure. The transformer 20 corresponds to a specific example of a "transformer" in one embodiment of the disclosure. The rectifying circuits 16A, 16B, 16C, and 16D each correspond to a specific example of a "rectifying circuit" in one embodiment of the disclosure. The smoothing circuits 17A, 17B, 17C, and 17D each correspond to a specific example of a "smoothing circuit" in one embodiment of the disclosure.

[Operation and Workings]

Next, a description will be given of operation and workings of the power conversion apparatus 1 of the present example embodiment.

(Outline of Overall Operation)

First, an outline of overall operation of the power conversion apparatus 1 will be described with reference to FIG. 1. In the power conversion apparatus 1, the transistors 13 and 14 perform switching operations in the switching circuit 12 to thereby generate an alternating-current voltage on the basis of a direct-current voltage supplied from the direct-current power supply PDC. The transformer 20 transforms the alternating-current voltage with the transformation ratio R. The rectifying circuit 16A rectifies an alternating-current voltage outputted from the windings 22A and 23A of the transformer 20. The rectifying circuit 16B rectifies an alternating-current voltage outputted from the windings 22B and 23B of the transformer 20. The rectifying circuit 16C rectifies an alternating-current voltage outputted from the windings 22C and 23C of the transformer 20. The rectifying circuit 16D rectifies an alternating-current voltage outputted from the windings 22D and 23D of the transformer 20. The smoothing circuit 17A smooths the voltage rectified by the rectifying circuit 16A. The smoothing circuit 17B smooths the voltage rectified by the rectifying circuit 16B. The smoothing circuit 17C smooths the voltage rectified by the rectifying circuit 16C. The smoothing circuit 17D smooths the voltage rectified by the rectifying circuit 16D.

(Detailed Operation)

FIG. 4 illustrates an operation example of the power conversion apparatus 1. In FIG. 4, "I1" denotes a current flowing through the winding 21, "I2" denotes a total current flowing through the windings 22A, 23A, 22B, 23B, 22C, 23C, 22D, and 23D, and "Im" denotes an excitation current. The excitation current Im is represented by $I1-I2\cdot R$. R is the transformation ratio of the transformer 20. The transformation ratio R is the number of turns of the primary-side winding (the windings 21B to 21E) of the transformer divided by the number of turns of the secondary-side winding (for example, the winding 22A) of the transformer.

In this example, at a timing t0, the gate signal G2 transitions from a high level to a low level. This turns off both of the transistors 13 and 14.

At a timing t1, the gate signal G1 transitions from the low level to the high level. This turns on the transistor 13. During a period from the timing t1 to a timing t2, the transistor 13 remains in the ON state, and the transistor 14 remains in the OFF state. Then, at the timing t2, the gate signal G1 transitions from the high level to the low level. This turns off the transistor 13.

At a timing t3, the gate signal G2 transitions from the low level to the high level. This turns on the transistor 14. During a period from the timing t3 to a timing t4, the transistor 13 remains in the OFF state, and the transistor 14 remains in the ON state. Then, at the timing t4, the gate signal G2 transitions from the high level to the low level. This turns off the transistor 14.

At a timing t5, the gate signal G1 transitions from the low level to the high level. This turns on the transistor 13.

In this way, the transistors 13 and 14 perform switching operations to thereby cause the currents I1 and I2 and the excitation current Im to flow through the transformer 20, as illustrated in FIG. 4. Specifically, the current I2 flowing through the secondary side of the transformer 20 becomes a sinusoidal current that is positive during a period from the timing t0 to the timing t2 and is negative during a period from the timing t2 to the timing t4. Further, the current I1 flowing through the primary side of the transformer 20 becomes a sinusoidal current that is phase-delayed relative to the current I2. The excitation current Im becomes a triangular-wave current that increases during the period from the timing t0 to the timing t2 and decreases during the period from the timing t2 to the timing t4.

Figure 5A:
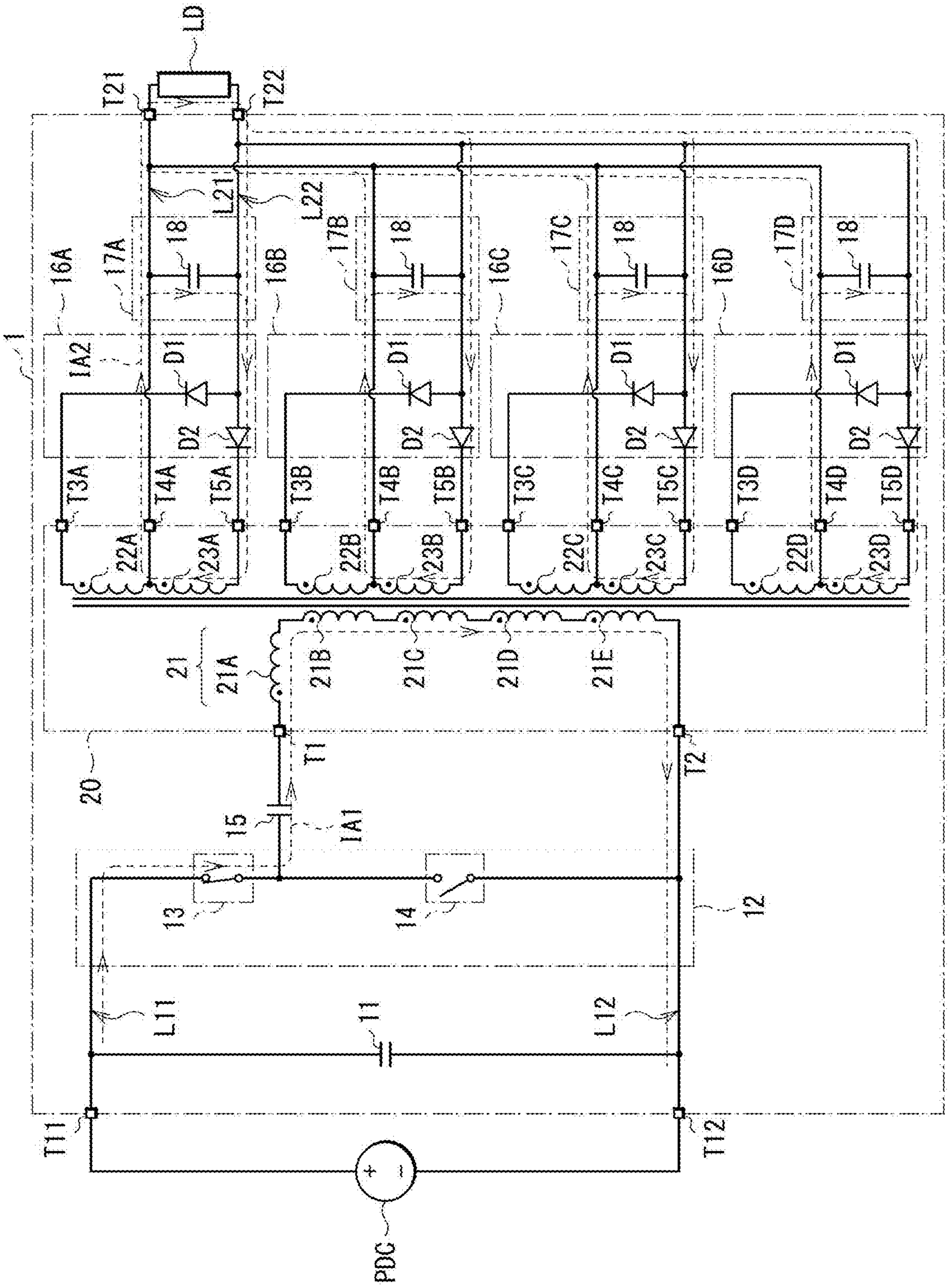
FIG. 5A is an explanatory diagram illustrating an operation state of the power conversion apparatus illustrated in FIG. 1.
Figure 5B:
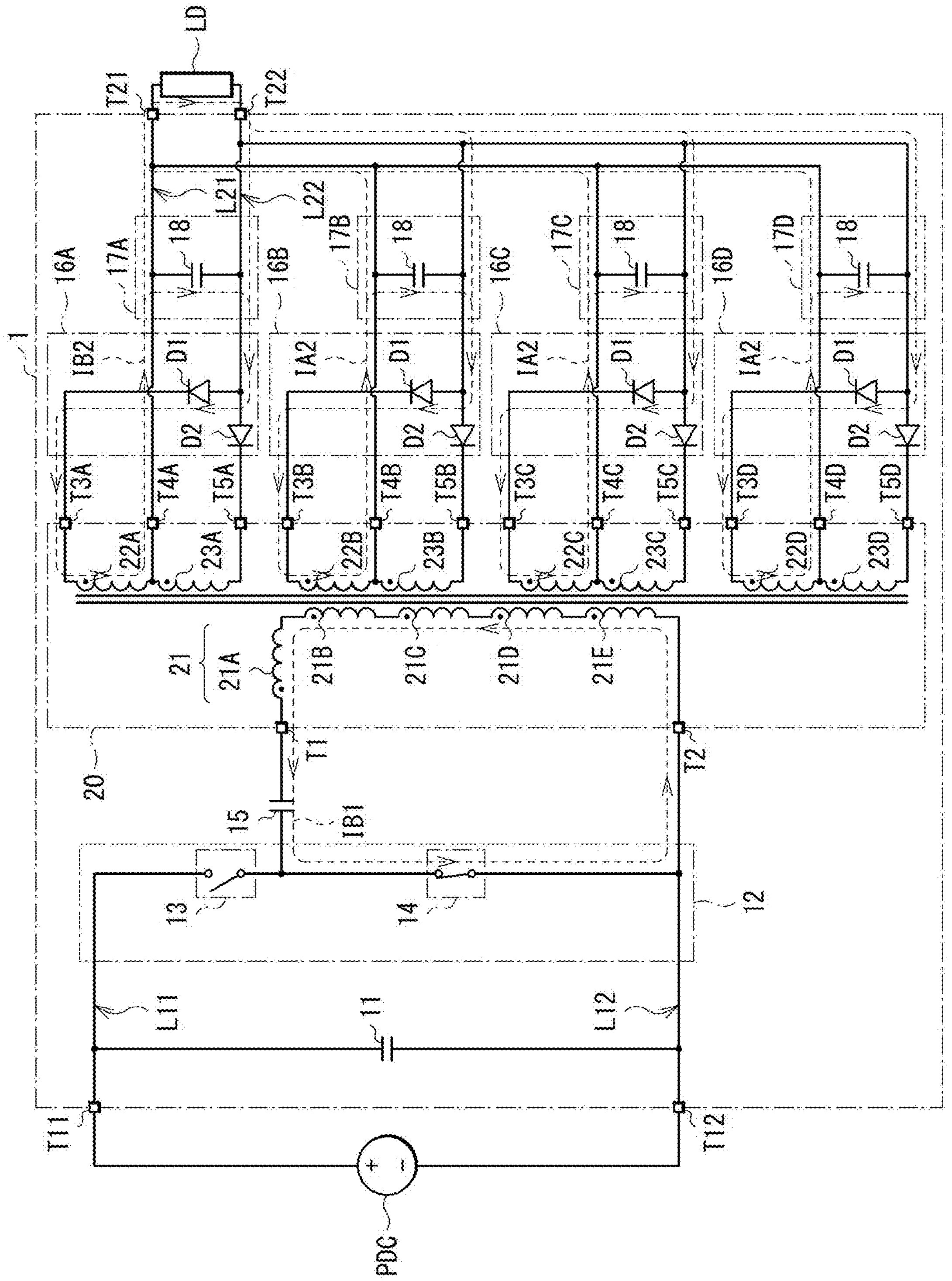
FIG. 5B is an explanatory diagram illustrating another operation state of the power conversion apparatus illustrated in FIG. 1.

FIGS. 5A and 5B illustrate flows of the currents in the power conversion apparatus 1. FIG. 5A illustrates an operation at a certain timing tA during the period from the timing t1 to the timing t2. FIG. 5B illustrates an operation at a certain timing tB during the period from the timing t3 to the timing t4. In these figures, each of the transistors 13 and 14 is represented by a symbol indicating its operation state (ON state or OFF state).

FIGS. 6A and 6B illustrate directions of magnetic flux at the leg parts 111 to 115 of the magnetic core 100. FIG. 6A illustrates the directions of magnetic flux at the timing tA, and FIG. 6B illustrates the directions of magnetic flux at the timing tB. FIGS. 7A and 7B illustrate directions of magnetic flux at the base part 102 of the magnetic core 100. FIG. 7A illustrates the directions of magnetic flux at the timing tA, and FIG. 7B illustrates the directions of magnetic flux at the timing tB.

During the period from the timing t1 to the timing t2, as illustrated in FIG. 4, the transistor 13 is in the ON state and the transistor 14 is in the OFF state. As a result, at the certain timing tA during the period from the timing t1 to the timing t2, as illustrated in FIG. 5A, in the primary-side circuitry a current IA1 flows through the transistor 13, the capacitor 15, the coupling terminal T1, the winding 21, and the coupling terminal T2 in this order. In response to the current IA1, in the secondary-side circuitry pertaining to the rectifying circuit 16A and the smoothing circuit 17A, for example, a current IA2 flows through the winding 23A, the coupling terminal T4A, the capacitor 18 and the load LD, the diode D2, and the coupling terminal T5A in this order. This similarly applies to the secondary-side circuitry pertaining to the rectifying circuit 16B and the smoothing circuit 17B, the secondary-side circuitry pertaining to the rectifying circuit 16C and the smoothing circuit 17C, and the secondary-side circuitry pertaining to the rectifying circuit 16D and the smoothing circuit 17D.

In this way, due to the current IA1 flowing through the winding 21 from the coupling terminal T1 to the coupling terminal T2, a magnetic flux is generated at each of the leg parts 111 to 115 in the transformer 20, as illustrated in FIG. 6A. Because the winding 21 is wound clockwise around each of the leg parts 111, 112, and 113, and counterclockwise around each of the leg parts 114 and 115, the magnetic flux at each of the leg parts 111, 112, and 113 is in a direction opposite to the Z direction, and the magnetic flux at each of the leg parts 114 and 115 is in the Z direction. At the base part 102, as illustrated in FIG. 7A, a magnetic flux that moves from the leg part 111 to the leg parts 114 and 115 is generated, a magnetic flux that moves from the leg part 112 to the leg parts 114 and 115 is generated, and a magnetic flux that moves from the leg part 113 to the leg parts 114 and 115 is generated. Directions of magnetic flux at the base part 101 are opposite to the directions of magnetic flux at the base part 102 (FIG. 7A).

During the period from the timing t3 to the timing t4, as illustrated in FIG. 4, the transistor 13 is in the OFF state and the transistor 14 is in the ON state. As a result, at the certain timing tB during the period from the timing t3 to the timing t4, as illustrated in FIG. 5B, in the primary-side circuitry a current IB1 flows through the capacitor 15, the transistor 14, the coupling terminal T2, the winding 21, and the coupling terminal T1 in this order. In response to the current IB1, in the secondary-side circuitry pertaining to the rectifying circuit 16A and the smoothing circuit 17A, for example, a current D32 flows through the winding 22A, the coupling terminal T4A, the capacitor 18 and the load LD, the diode D1, and the coupling terminal T3A in this order. This similarly applies to the secondary-side circuitry pertaining to the rectifying circuit 16B and the smoothing circuit 17B, the secondary-side circuitry pertaining to the rectifying circuit 16C and the smoothing circuit 17C, and the secondary-side circuitry pertaining to the rectifying circuit 16D and the smoothing circuit 17D.

In this way, due to the current D31 flowing through the winding 21 from the coupling terminal T2 to the coupling terminal T1, a magnetic flux is generated at each of the leg parts 111 to 115 in the transformer 20, as illustrated in FIG. 6B. The magnetic flux at each of the leg parts 111, 112, and 113 is in the Z direction, and the magnetic flux at each of the leg parts 114 and 115 is in the opposite direction to the Z direction. At the base part 102, as illustrated in FIG. 7B, a magnetic flux that moves from the leg part 114 to the leg parts 111, 112, and 113 is generated, and a magnetic flux that moves from the leg part 115 to the leg parts 111, 112, and 113 is generated. Directions of magnetic flux at the base part 101 are opposite to the directions of magnetic flux at the base part 102 (FIG. 7B).

The power conversion apparatus 1 repeats such operations to thereby transform direct-current electric power supplied from the direct-current power supply PDC and output the transformed direct-current electric power. The power conversion apparatus 1 controls the operations of the transistors 13 and 14 by using pulse width modulation (PWM) to thereby control an output voltage to be constant.

In the power conversion apparatus 1, the five leg parts 111 to 115 are provided, the leg parts 112 and 113 are disposed with the leg part 111 interposed therebetween in the X direction, and the leg parts 114 and 115 are disposed with the leg part 111 interposed therebetween in the Y direction. Further, in the direction from the coupling terminal T1 to the coupling terminal T2, the winding 21 is wound around the leg parts 111, 112, and 113 in the first winding direction, and around the leg parts 114 and 115 in the second winding direction. As a result, in the transformer 20, as illustrated in FIGS. 7A and 7B, a magnetic flux in the first direction is generated at each of the leg parts 111, 112, and 113, and a magnetic flux in the second direction is generated at each of the leg parts 114 and 115. Further, the magnetic flux is dispersed at the base parts 101 and 102. By dispersing the magnetic flux at the base parts 101 and 102 as described above, it is possible to reduce magnetic flux densities at the base parts 101 and 102. This makes it possible for the base parts 101 and 102 to be reduced in height in the Z direction. Further, by virtue of the provision of the five leg parts 111 to 115 as described above, it is possible to reduce the number of turns of the winding 21 at each of the leg parts 111 to 115, and it is thus possible to reduce the number of layers of the substrate 200, for example. This makes it possible for the leg parts 111 to 115 to be reduced in height in the Z direction. As a result, it is possible for the power conversion apparatus 1 to achieve a reduction in size of the transformer 20.

In the power conversion apparatus 1, in particular, the cross-sectional areas of the leg parts 114 and 115 are greater than the cross-sectional areas of the leg parts 112 and 113, and the widths of the leg parts 114 and 115 in the X direction are greater than the widths of the leg parts 112 and 113 in the Y direction. This makes it possible, in the power conversion apparatus 1, to disperse a large magnetic flux that moves from the leg part 111 having only the primary-side winding wound therearound to the leg parts 114 and 115 through the base part 101, for example, at timings at which the current I1 on the primary side becomes maximum (timings t6 and t7 in FIG. 4), for example. Accordingly, in the power conversion apparatus 1, it is possible to disperse a large magnetic flux generated by the resonant coil when the current at the resonant coil becomes maximum, and to thereby reduce the magnetic flux density. At this time, the magnetic flux generated at each of the leg parts 112 and 113 is canceled out by the current I2 flowing in the opposite direction to the direction of the current I1 flowing on the primary side. This results in a magnetic flux distribution similar to that of a three-leg core, such as an EI core or an EE core, having three leg parts 111, 114, and 115. Further, the magnetic flux in the transformer 20 becomes maximum at timings at which the excitation current Im becomes maximum (the timings t0 and t2 in FIG. 4), for example. At this time, the current I2 does not flow on the secondary side, and the current I1 on the primary side causes a magnetic flux to occur at each of the five leg parts 111 to 115. It is possible to disperse the magnetic flux to the base parts 101 and 102, as illustrated in FIGS. 7A and 7B. As a result, it is possible to effectively reduce the size of the transformer 20.

Further, in the power conversion apparatus 1, the winding 21 is wound around the five leg parts 111 to 115, and the windings 22A, 23A, 22B, 23B, 22C, 23C, 22D, and 23D are wound around the four leg parts 112 to 115 other than the leg part 111. This makes it possible to allow the portion of the winding 21 wound around the leg part 111 to serve as a resonant coil. It is thus possible, in the transformer 20, to combine the resonant coil and the transformer. This allows for a reduction in size of the power conversion apparatus 1 as compared with a case where a resonant coil and a transformer are provided separately. Further, because it is possible to increase the inductance of the resonant coil, the power conversion apparatus 1 (an LLC resonant converter) is able to largely change a ratio of an output voltage to an input voltage by changing a switching frequency. Accordingly, the power conversion apparatus 1 is able to control the output voltage to be constant over a wide input voltage range by frequency control, and is thus able to operate over the wide input voltage range.

[Effects]

As described above, according to the present example embodiment, the five leg parts 111 to 115 are provided, the leg parts 112 and 113 are disposed with the leg part 111 interposed therebetween in the X direction, and the leg parts 114 and 115 are disposed with the leg part 111 interposed therebetween in the Y direction. Further, in the direction from the coupling terminal T1 to the coupling terminal T2, the winding 21 is wound around the leg parts 111, 112, and 113 in the first winding direction, and around the leg parts 114 and 115 in the second winding direction. This makes it possible to reduce the size of the transformer. In particular, the cross-sectional areas of the leg parts 114 and 115 are greater than the cross-sectional areas of the leg parts 112 and 113, and the widths of the leg parts 114 and 115 in the X direction are greater than the widths of the leg parts 112 and 113 in the Y direction. This makes it possible to effectively reduce the size of the transformer.

In the present example embodiment, the winding 21 is wound around the five leg parts 111 to 115, and the windings 22A, 23A, 22B, 23B, 22C, 23C, 22D, and 23D are wound around the four leg parts 112 to 115 other than the leg part 111. This makes it possible for the power conversion apparatus to be reduced in size and to operate over a wide input voltage range.

Modification Example 1-1

In the foregoing example embodiment, the windings 21A, 21B, 21C, 21D, and 21E are coupled in series to configure the winding 21 in the transformer 20. However, this is non-limiting. A power conversion apparatus 1A according to the present modification example will be described in detail below.

Figure 8:
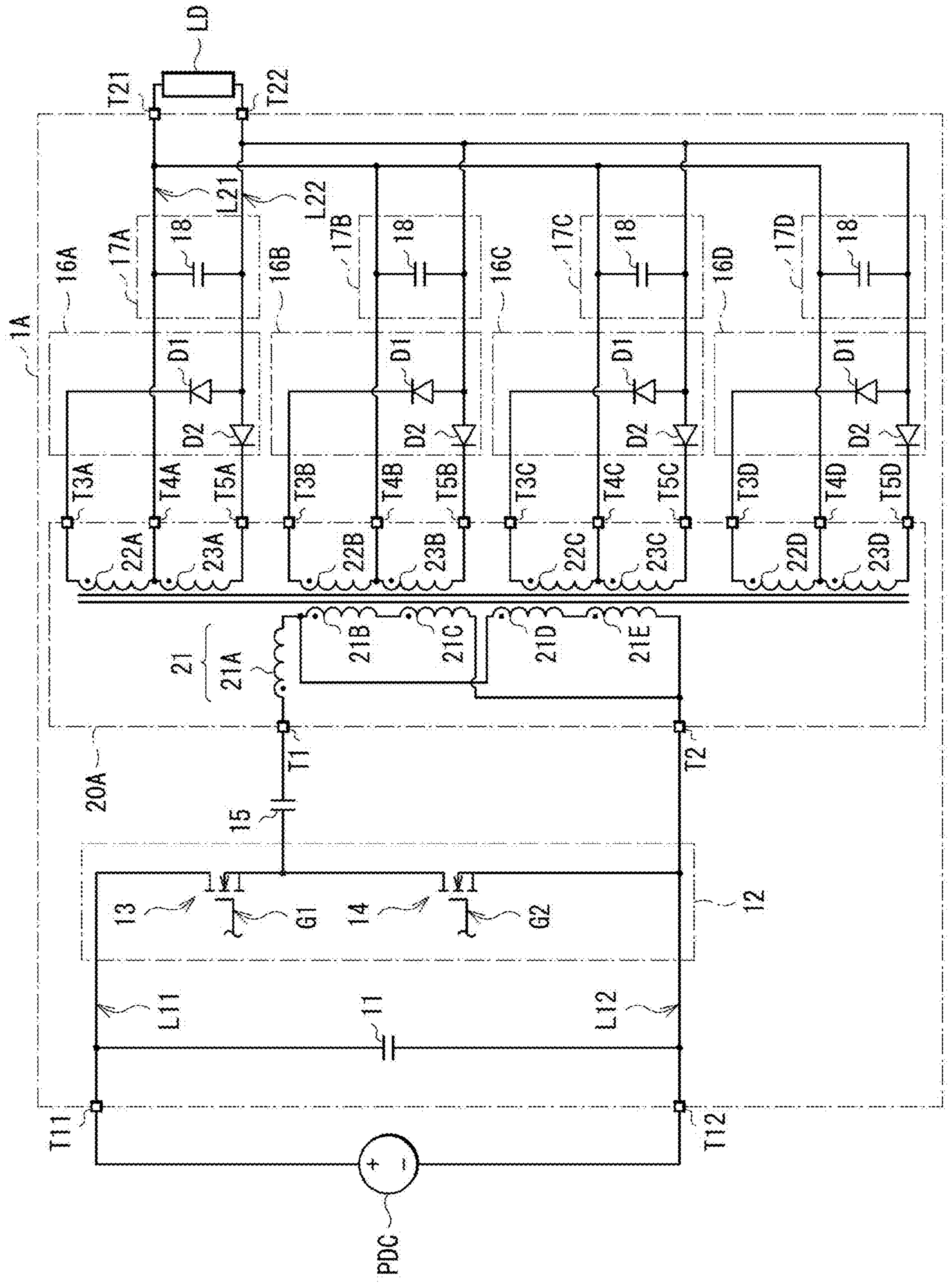
FIG. 8 is a circuit diagram illustrating a configuration example of a power conversion apparatus according to a modification example of one example embodiment of the technology.

FIG. 8 illustrates a configuration example of the power conversion apparatus 1A. The power conversion apparatus 1A includes a transformer 20A. The transformer 20A includes the winding 21. The winding 21 has the one end coupled to the coupling terminal T1, and the other end coupled to the coupling terminal T2. The winding 21 includes the windings 21A, 21B, 21C, 21D, and 21E. The winding 21A has one end coupled to the coupling terminal T1, and another end coupled to one end of each of the windings 21B and 21D. The winding 21B has one end coupled to the other end of the winding 21A, and another end coupled to one end of the winding 21C. The winding 21C has the one end coupled to the other end of the winding 21B, and another end coupled to the coupling terminal T2. The winding 21D has the one end coupled to the other end of the winding 21A, and another end coupled to one end of the winding 21E. The winding 21E has the one end coupled to the other end of the winding 21D, and another end coupled to the coupling terminal T2. Thus, the windings 21B and 21C and the windings 21D and 21E are coupled to each other in parallel.

Figure 9:
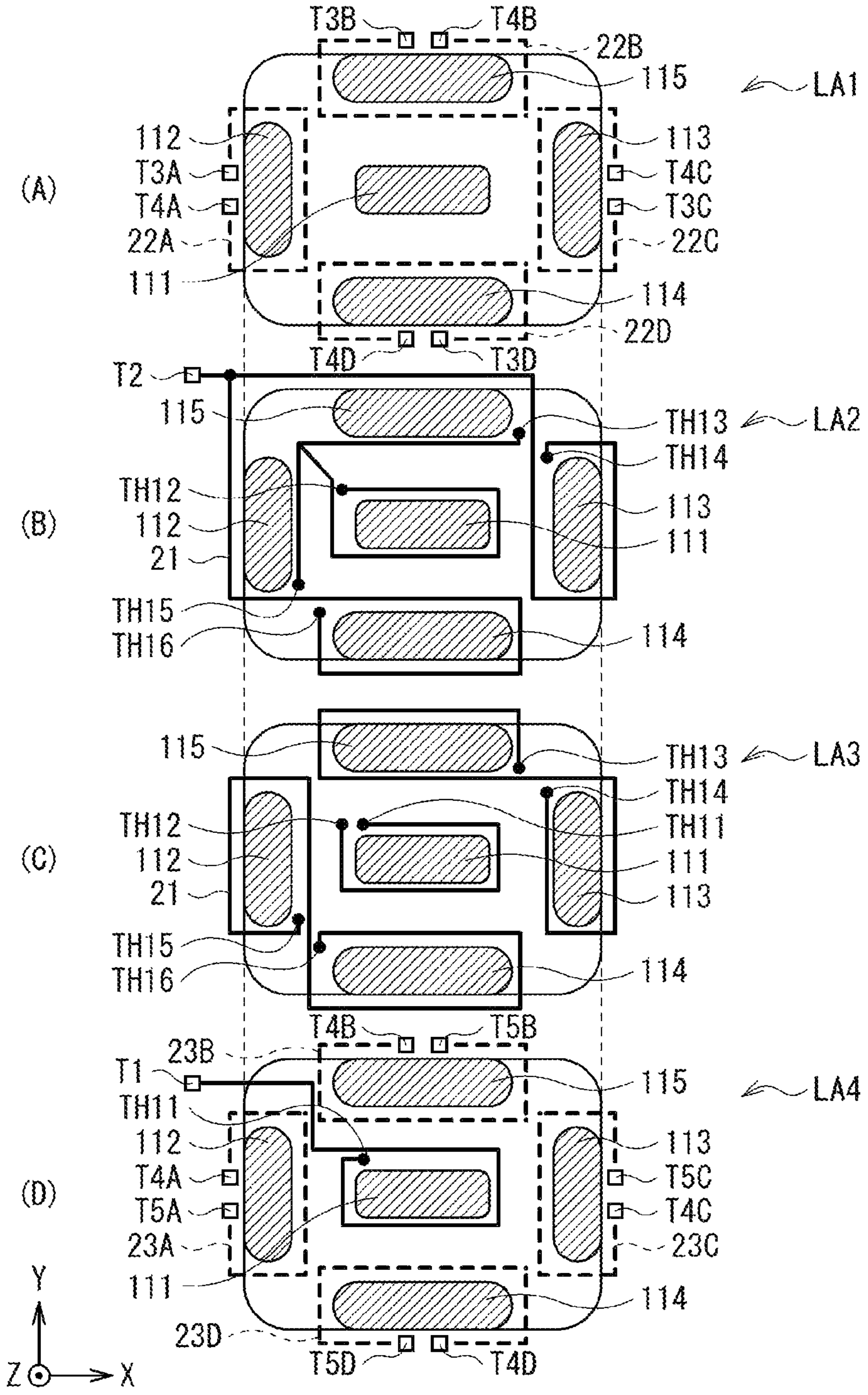
FIG. 9 is an explanatory diagram illustrating a configuration example of windings illustrated in FIG. 8.

FIG. 9 illustrates a configuration example of the windings at the substrate 200 of the transformer 20A. The winding 21 is provided in the wiring layers LA2 to LA4. The substrate 200 is provided with a through hole TH11 coupling the wiring line of the wiring layer LA3 and a wiring line of the wiring layer LA4, and through holes TH12 to TH16 coupling the wiring line of the wiring layer LA2 and the wiring line of the wiring layer LA3. The winding 21 includes these through holes TH11 to TH16 and is coupled to the coupling terminals T1 and T2. The winding 21 is wound around the five leg parts 111 to 115. Specifically, in the direction from the coupling terminal T1 to the coupling terminal T2, the winding 21 is wound clockwise three times around the leg part 111, clockwise twice around each of the leg parts 112 and 113, and counterclockwise twice around each of the leg parts 114 and 115. A portion of the winding 21 that is wound around the leg part 111 corresponds to the winding 21A which constitutes the resonant coil, and portions of the winding 21 that are wound around the leg parts 112 to 115 correspond to the windings 21B to 21D which constitute the primary-side winding of the transformer.

Modification Example 1-2

In the foregoing example embodiment, the switching circuit 12 is configured using the two transistors 13 and 14, and each rectifying circuit 16 is configured using the two diodes D1 and D2. However, this is non-limiting. A power conversion apparatus 1B according to the present modification example will be described in detail below.

Figure 10:
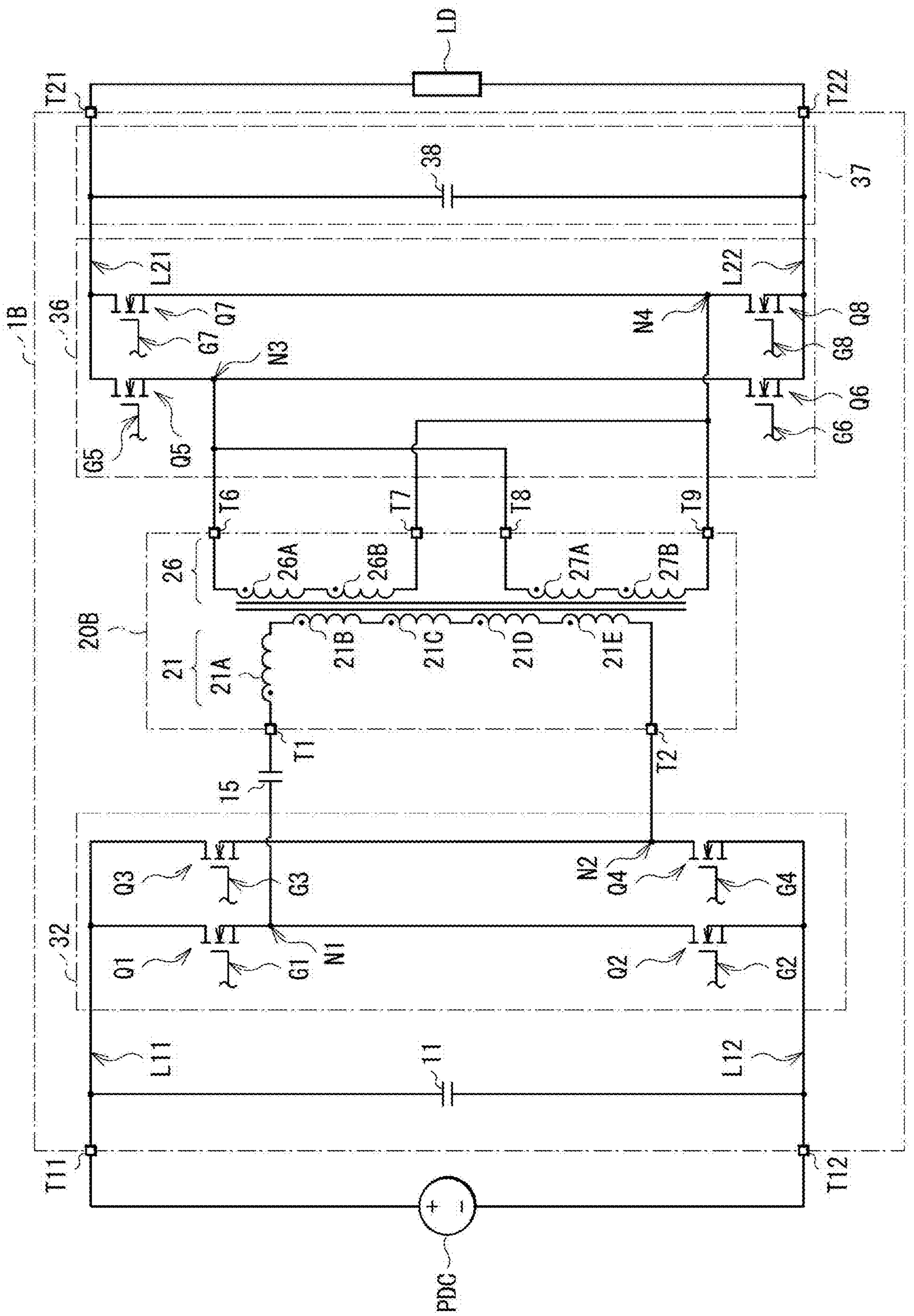
FIG. 10 is a circuit diagram illustrating a configuration example of a power conversion apparatus according to a modification example of one example embodiment of the technology.

FIG. 10 illustrates a configuration example of the power conversion apparatus 1B. The power conversion apparatus 1B includes the capacitor 11, a switching circuit 32, the capacitor 15, a transformer 20B, a rectifying circuit 36, and a smoothing circuit 37.

In this example, the switching circuit 32 is a so-called full-bridge-type circuit and includes transistors Q1 to Q4. The transistor Q1 has a drain coupled to the voltage line L11, a gate receiving the gate signal G1 from an unillustrated controller, and a source coupled to a node N1. The transistor Q2 has a drain coupled to the node N1, a gate receiving the gate signal G2 from an unillustrated controller, and a source coupled to the reference voltage line L12. The transistor Q3 has a drain coupled to the voltage line L11, a gate receiving a gate signal G3 from an unillustrated controller, and a source coupled to a node N2. The transistor Q4 has a drain coupled to the node N2, a gate receiving a gate signal G4 from an unillustrated controller, and a source coupled to the reference voltage line L12.

The capacitor 15 has one end coupled to the node N1 of the switching circuit 32, and the other end coupled to the coupling terminal T1 of the transformer 20B.

The transformer 20B includes coupling terminals T1, T2, T6, T7, T8, and T9, and windings 21, 26, and 27.

The coupling terminal T1 is coupled to the other end of the capacitor 15, and the coupling terminal T2 is coupled to the node N2 of the switching circuit 32. The coupling terminals T6 and T8 are coupled to a node N3 (described later) of the rectifying circuit 36. The coupling terminals T7 and T9 are coupled to a node N4 (described later) of the rectifying circuit 36.

The winding 26 has one end coupled to the coupling terminal T6, and another end coupled to the coupling terminal T7. The winding 26 includes windings 26A and 26B. The windings 26A and 26B are coupled in series. The winding 26A is coupled to the coupling terminal T6, and the winding 26B is coupled to the coupling terminal T7.

The winding 27 has one end coupled to the coupling terminal T8, and another end coupled to the coupling terminal T9. The winding 27 includes windings 27A and 27B. The windings 27A and 27B are coupled in series. The winding 27A is coupled to the coupling terminal T8, and the winding 27B is coupled to the coupling terminal T9.

The rectifying circuit 36 is configured to rectify an alternating-current voltage outputted from the transformer 20B. The rectifying circuit 36 includes transistors Q5 to Q8. The transistor Q5 has a drain coupled to the voltage line L21, a gate receiving a gate signal G5 from an unillustrated controller, and a source coupled to the node N3. The transistor Q6 has a drain coupled to the node N3, a gate receiving a gate signal G6 from an unillustrated controller, and a source coupled to the reference voltage line L22. The transistor Q7 has a drain coupled to the voltage line L21, a gate receiving a gate signal G7 from an unillustrated controller, and a source coupled to the node N4. The transistor Q8 has a drain coupled to the node N4, a gate receiving a gate signal G8 from an unillustrated controller, and a source coupled to the reference voltage line L22.

The smoothing circuit 37 is configured to smooth the voltage rectified by the rectifying circuit 36. The smoothing circuit 37 includes a capacitor 38. The capacitor 38 has one end coupled to the voltage line L21, and another end coupled to the reference voltage line L22.

FIG. 11 illustrates a configuration example of the windings at the substrate 200 of the transformer 20B. In FIG. 11, the winding 21 is illustrated in solid lines, and the windings 26 and 27 are illustrated in broken lines. The configurations of the wiring layers LA2 and LA3 are similar to those in a case of the foregoing example embodiment (FIG. 3).

The wiring layers LA1 and LA4 are provided with the windings 26 and 27. The substrate 200 is provided with through holes TH21 to TH24 coupling the wiring line of the wiring layer LA1 and the wiring line of the wiring layer LA4.

The winding 26 includes the through holes TH21 and TH22 and is coupled to the coupling terminals T6 and T7. The winding 26 is wound around the leg parts 112 and 115. Specifically, in a direction from the coupling terminal T6 to the coupling terminal T7, the winding 26 is wound clockwise twice around the leg part 112, and counterclockwise twice around the leg part 115.

The winding 27 includes the through holes TH23 and TH24 and is coupled to the coupling terminals T8 and T9. The winding 27 is wound around the leg parts 113 and 114. Specifically, in a direction from the coupling terminal T8 to the coupling terminal T9, the winding 27 is wound clockwise twice around the leg part 113, and counterclockwise twice around the leg part 114.

FIG. 12 illustrates an example of switching operations of the switching circuit 32.

In this example, at a timing t10, the gate signals G2 and G3 transition from the high level to the low level. This turns off both of the transistors Q2 and Q3.

At a timing t11, the gate signals G1 and G4 transition from the low level to the high level. This turns on the transistors Q1 and Q4. During a period from the timing t11 to a timing t12, the transistors Q1 and Q4 remain in the ON state, and the transistors Q2 and Q3 remains in the OFF state. Then, at the timing t12, the gate signals G1 and G4 transition from the high level to the low level. This turns off the transistors Q1 and Q4.

At a timing t13, the gate signals G2 and G3 transition from the low level to the high level. This turns on the transistors Q2 and Q3. During a period from the timing t13 to a timing t14, the transistors Q1 and Q4 remain in the OFF state, and the transistors Q2 and Q3 remains in the ON state. Then, at the timing t14, the gate signals G2 and G3 transition from the high level to the low level. This turns off the transistors Q2 and Q3.

At a timing t15, the gate signals G1 and G4 transition from the low level to the high level. This turns on the transistors Q1 and Q4.

Figure 13A:
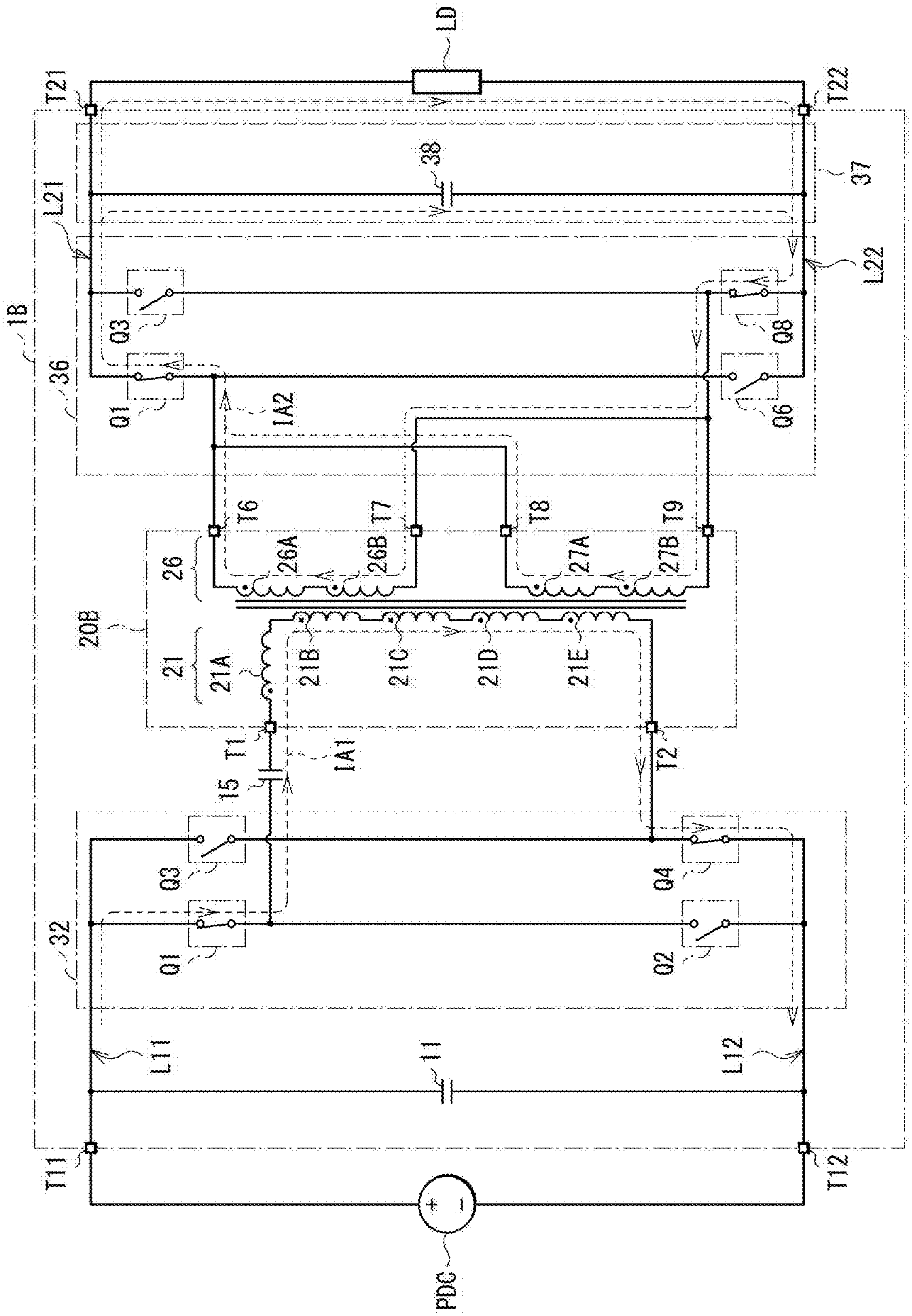
FIG. 13A is an explanatory diagram illustrating an operation state of the power conversion apparatus illustrated in FIG. 10.
Figure 13B:
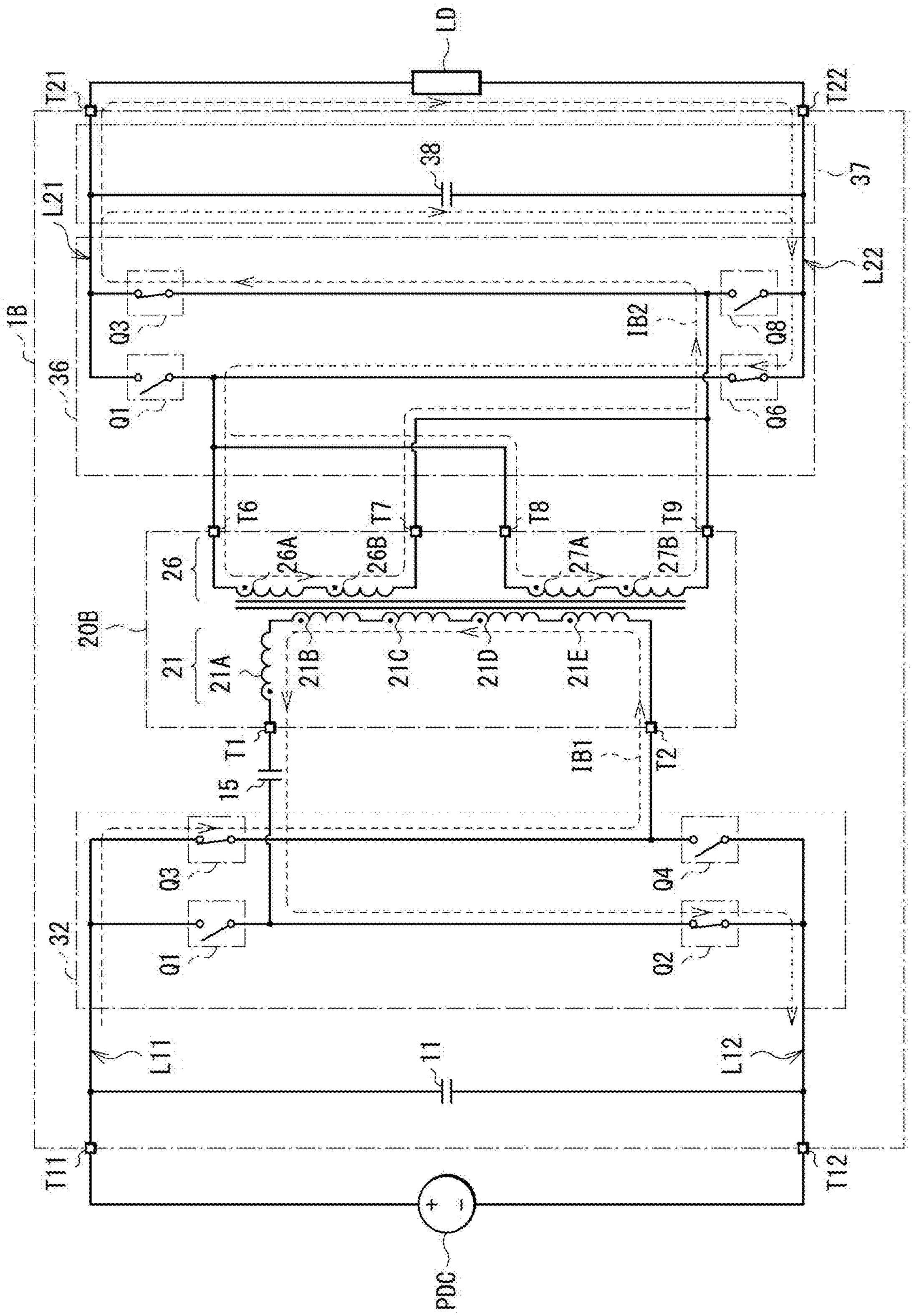
FIG. 13B is an explanatory diagram illustrating another operation state of the power conversion apparatus illustrated in FIG. 10.

FIGS. 13A and 13B illustrate operations of the power conversion apparatus 1B. FIG. 13A illustrates an operation at a certain timing tA during the period from the timing t11 to the timing t12. FIG. 13B illustrates an operation at a certain timing tB during the period from the timing t13 to the timing t14.

During the period from the timing t11 to the timing t12, as illustrated in FIG. 12, the transistors Q1 and Q4 are in the ON state, and the transistors Q2 and Q3 are in the OFF state. At this time, in the rectifying circuit 36, the transistors Q5 and Q8 are in the ON state in accordance with the gate signals G5 and G8, and the transistors Q6 and Q7 are in the OFF state in accordance with the gate signals G6 and G7. As a result, at the certain timing tA during the period from the timing t11 to the timing t12, as illustrated in FIG. 13A, in the primary-side circuitry the current IA1 flows through the transistor Q1, the capacitor 15, the coupling terminal T1, the winding 21, the coupling terminal T2, and the transistor Q4 in this order. In response to the current IA1, in the secondary-side circuitry the current IA2 flows through the windings 26 and 27, the coupling terminals T6 and T8, the transistor Q5, the capacitor 38 and the load LD, the transistor Q8, and the coupling terminals T7 and T9 in this order.

During the period from the timing t13 to the timing t14, as illustrated in FIG. 12, the transistors Q1 and Q4 are in the OFF state, and the transistors Q2 and Q3 are in the ON state. At this time, in the rectifying circuit 36, the transistors Q5 and Q8 are in the OFF state in accordance with the gate signals G5 and G8, and the transistors Q6 and Q7 are in the ON state in accordance with the gate signals G6 and G7. As a result, at the certain timing tB during the period from the timing t13 to the timing t14, as illustrated in FIG. 13B, in the primary-side circuitry the current IB1 flows through the transistor Q3, the coupling terminal T2, the winding 21, the coupling terminal T1, the capacitor 15, and the transistor Q2 in this order. In response to the current IB1, in the secondary-side circuitry the current IB2 flows through the windings 26 and 27, the coupling terminals T7 and T9, the transistor Q7, the capacitor 38 and the load LD, the transistor Q6, and the coupling terminals T6 and T8 in this order.

The power conversion apparatus 1B repeats such operations to thereby transform direct-current electric power supplied from the direct-current power supply PDC and output the transformed direct-current electric power. The power conversion apparatus 1B controls the operations of the transistors Q1 to Q4 by using PWM to thereby control the output voltage to be constant.

In this example, the direct-current power supply PDC is coupled to the terminals T11 and T12, and the load LD is coupled to the terminals T21 and T22. However, this is non-limiting. Alternatively, the direct-current power supply PDC may be coupled to the terminals T21 and T22, and the load LD may be coupled to the terminals T11 and T12. In this case, the power conversion apparatus 1B is able to transform the direct-current electric power supplied from the direct-current power supply PDC and output the transformed direct-current electric power by causing the transistors Q5 to Q8 to operate as a switching circuit and causing the transistors Q1 to Q4 to operate as a rectifying circuit.

Further, in this example, as illustrated in FIG. 10, the windings 26A and 26B and the windings 27A and 27B are coupled in parallel. However, this is non-limiting. For example, the coupling terminals T7 and T8 may be omitted and the four windings 26A, 26B, 27A, and 27B may be coupled in series. In this case, the windings on the secondary side configure a single winding.

Modification Example 1-3

Figure 14:
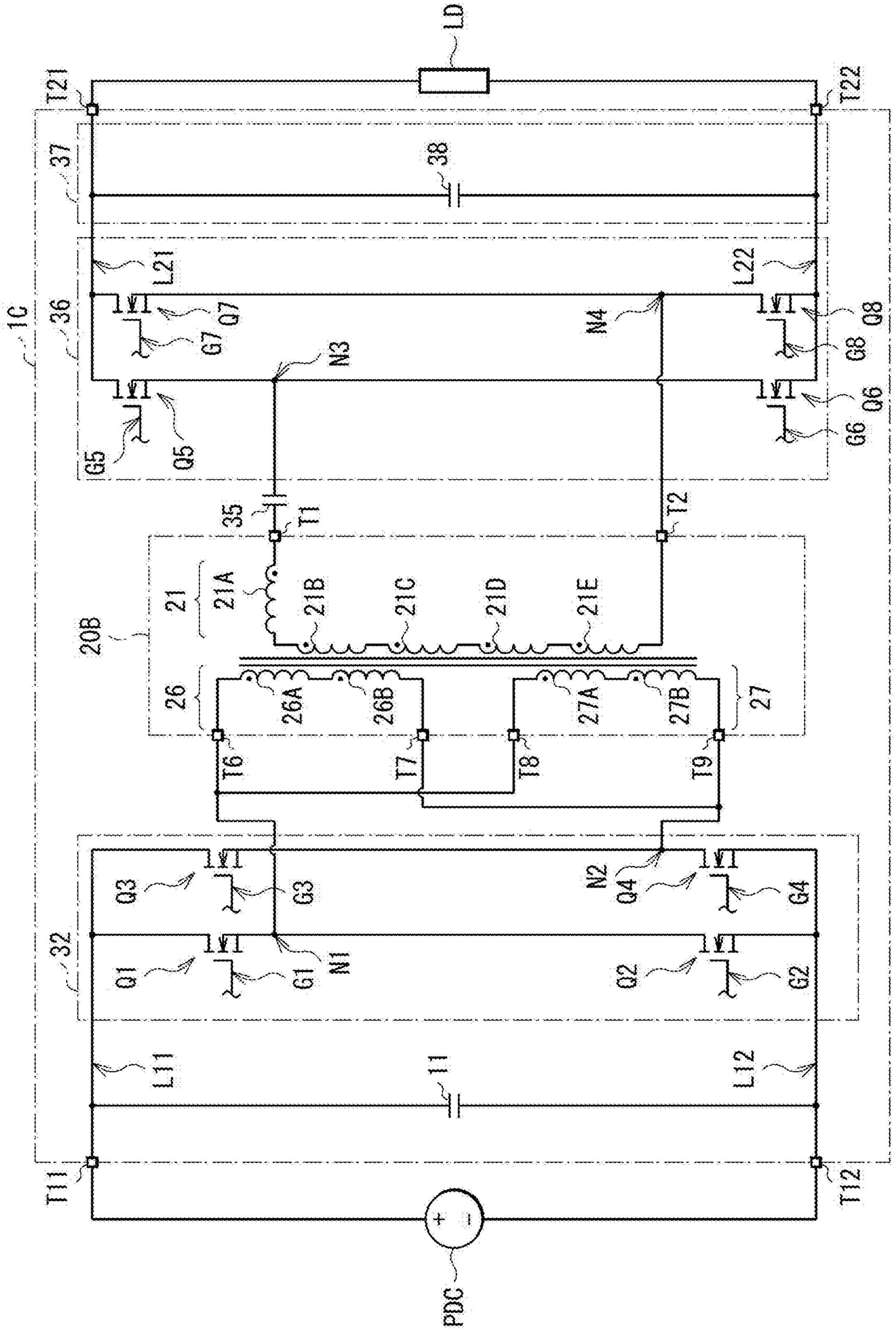
FIG. 14 is a circuit diagram illustrating a configuration example of a power conversion apparatus according to a modification example of one example embodiment of the technology.

In the foregoing example embodiment, the winding 21 including the resonant coil is coupled to the primary-side circuitry in the power conversion apparatus 1. However, this is non-limiting. Alternatively, for example, the winding 21 may be coupled to the secondary-side circuitry, as in a power conversion apparatus 1C illustrated in FIG. 14. The power conversion apparatus 1C includes the capacitor 11, the switching circuit 32, the transformer 20B, a capacitor 35, the rectifying circuit 36, and the smoothing circuit 37. The coupling terminals T6 and T8 of the transformer 20B are coupled to the node N1 of the switching circuit 32. The coupling terminals T7 and T9 of the transformer 20B are coupled to the node N2 of the switching circuit 32. The coupling terminal T1 of the transformer 20B is coupled to one end of the capacitor 35. The coupling terminal T2 of the transformer 20B is coupled to the node N4 of the rectifying circuit 36. The capacitor 35 has the one end coupled to the coupling terminal T1 of the transformer 20B, and another end coupled to the node N3 of the rectifying circuit 36.

Modification Example 1-4

The transformer 20 of the foregoing example embodiment may further include a heat sink. A transformer 20D according to the present modification example will be described in detail below. The transformer 20D includes a magnetic core 100D, the substrate 200, and a heat sink 130.

Figure 15:
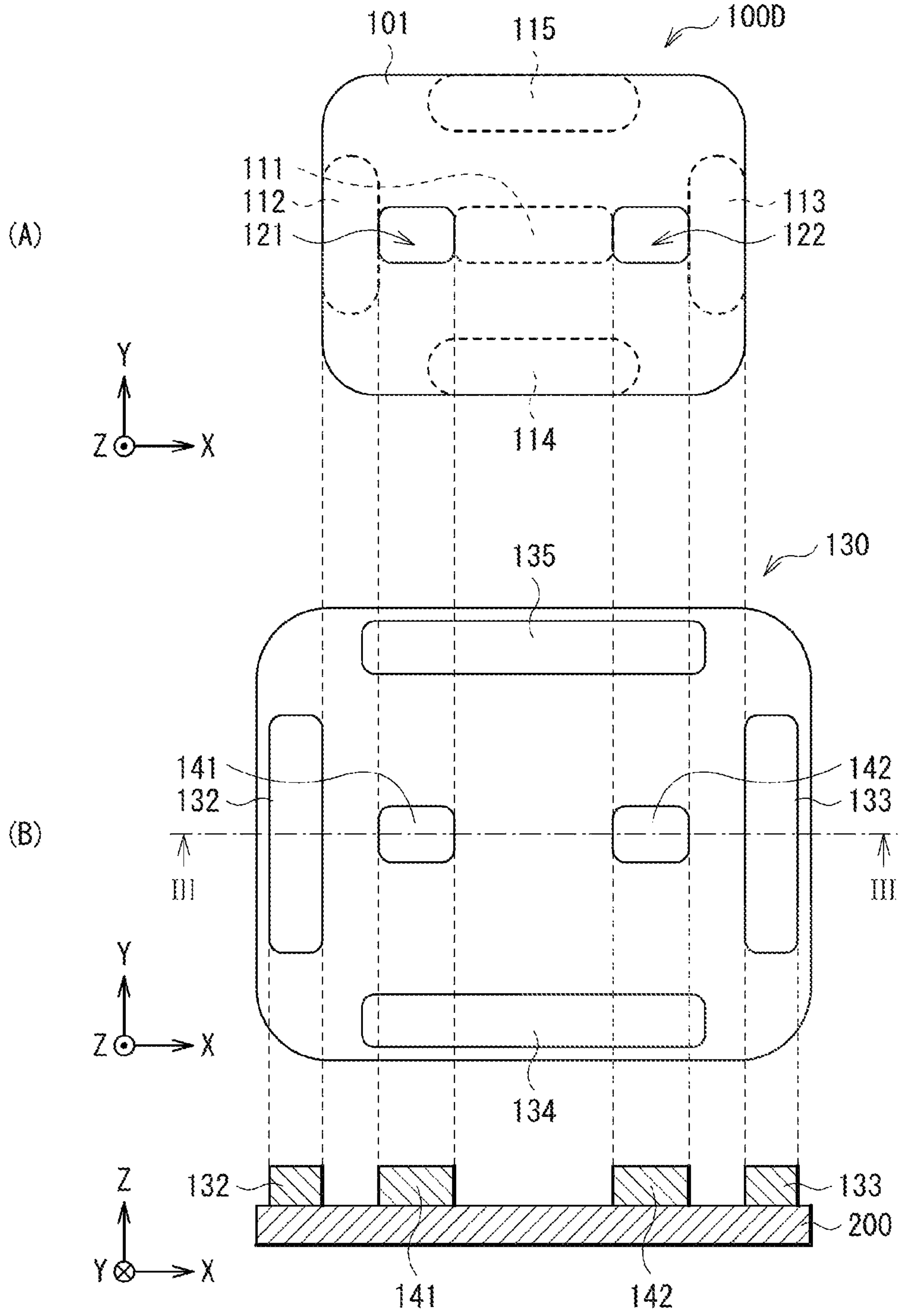
FIG. 15 is an explanatory diagram illustrating a configuration example of a transformer according to a modification example of one example embodiment of the technology.

FIG. 15 illustrates a configuration example of the transformer 20D, in which part (A) illustrates the magnetic core 100D, and part (B) illustrates the heat sink 130. Part (B) of FIG. 15 also illustrates a cross section of the heat sink 130 as viewed in a direction of arrows III-III.

The base parts 101 and 102 of the magnetic core 100D each have openings 121 and 122. The opening 121 is provided between the leg part 111 and the leg part 112, and has a generally rectangular shape. The opening 122 is provided between the leg part 111 and the leg part 113, and has a generally rectangular shape. In this example, the openings 121 and 122 of the base part 102 are configured to respectively mate with projections 141 and 142 (described later) of the heat sink 130.

The heat sink 130 is a heat-dissipating member including a metal material having high thermal conductivity, such as aluminum. The heat sink 130 in this example includes six projections 132 to 135, 141, and 142. The projections 132 to 135, 141, and 142 each have a generally rectangular shape, and each have a height in the Z direction almost equal to the thickness of the base part 102, for example. The base part 102 of the magnetic core 100D mates with a region surrounded by the projections 132 to 135 of the heat sink 130. The projection 141 mates with the opening 121 of the base part 102. The projection 142 mates with the opening 122 of the base part 102. As a result, the projections 132 to 135, 141, and 142 of the heat sink 130 are thermally coupled to the substrate 200 of the magnetic core 100D. Note that an insulating and heat-dissipating sheet may be provided over a top surface of each of the projections 132 to 135, 141, and 142 of the heat sink 130, and the projections 132 to 135, 141, and 142 may thus be thermally coupled to the substrate 200 of the magnetic core 100D with the insulating and heat-dissipating sheet interposed therebetween.

Here, the magnetic core 100D corresponds to a specific example of the "magnetic core" in one embodiment of the disclosure. The opening 121 corresponds to a specific example of a "first opening" in one embodiment of the disclosure. The opening 122 corresponds to a specific example of a "second opening" in one embodiment of the disclosure. The projection 141 corresponds to a specific example of a "first projection" in one embodiment of the disclosure. The projection 142 corresponds to a specific example of a "second projection" in one embodiment of the disclosure.

As described above, in the transformer 20D, the base parts 101 and 102 of the magnetic core 100D are provided with the openings 121 and 122. This allows for heat dissipation not only from a peripheral part of the magnetic core 100D but also from the vicinity of a middle part of the magnetic core 100D, thus making it possible to improve a heat dissipation characteristic. In particular, in the transformer 20D, the openings 121 and 122 are provided in a region where the magnetic flux density is sufficiently low, as illustrated in FIGS. 7A and 7B. This makes it possible to effectively improve the heat dissipation characteristic while maintaining a magnetic characteristic.

Further, the transformer 20D is provided with the heat sink 130. This makes it possible to further improve the heat dissipation characteristic.

Note that although the heat sink 130 is attached to the base part 102 in the transformer 20D, this is non-limiting, and the heat sink 130 may be attached to the base part 101, or the heat sink 130 may be attached to each of the base parts 101 and 102. Further, although the openings 121 and 122 are provided in each of the base parts 101 and 102, this is non-limiting, and the openings 121 and 122 may be provided only in one of the base parts 101 and 102.

Modification Example 1-5

For example, an air gap, a spacer gap, a gap sheet, or the like may be provided on magnetic coupling portions in some or all of the leg pats 111 to 115.

Other Modification Examples

Further, two or more of these modification examples may be combined.

2. Second Example Embodiment

Next, a description will be given of a power conversion apparatus 2 according to a second example embodiment. The present example embodiment is different from the foregoing first example embodiment in the configuration of the transformer. Note that components substantially the same as those in the power conversion apparatus 1 according to the foregoing first example embodiment are denoted with the same reference signs and a description thereof is omitted where appropriate.

Figure 16:
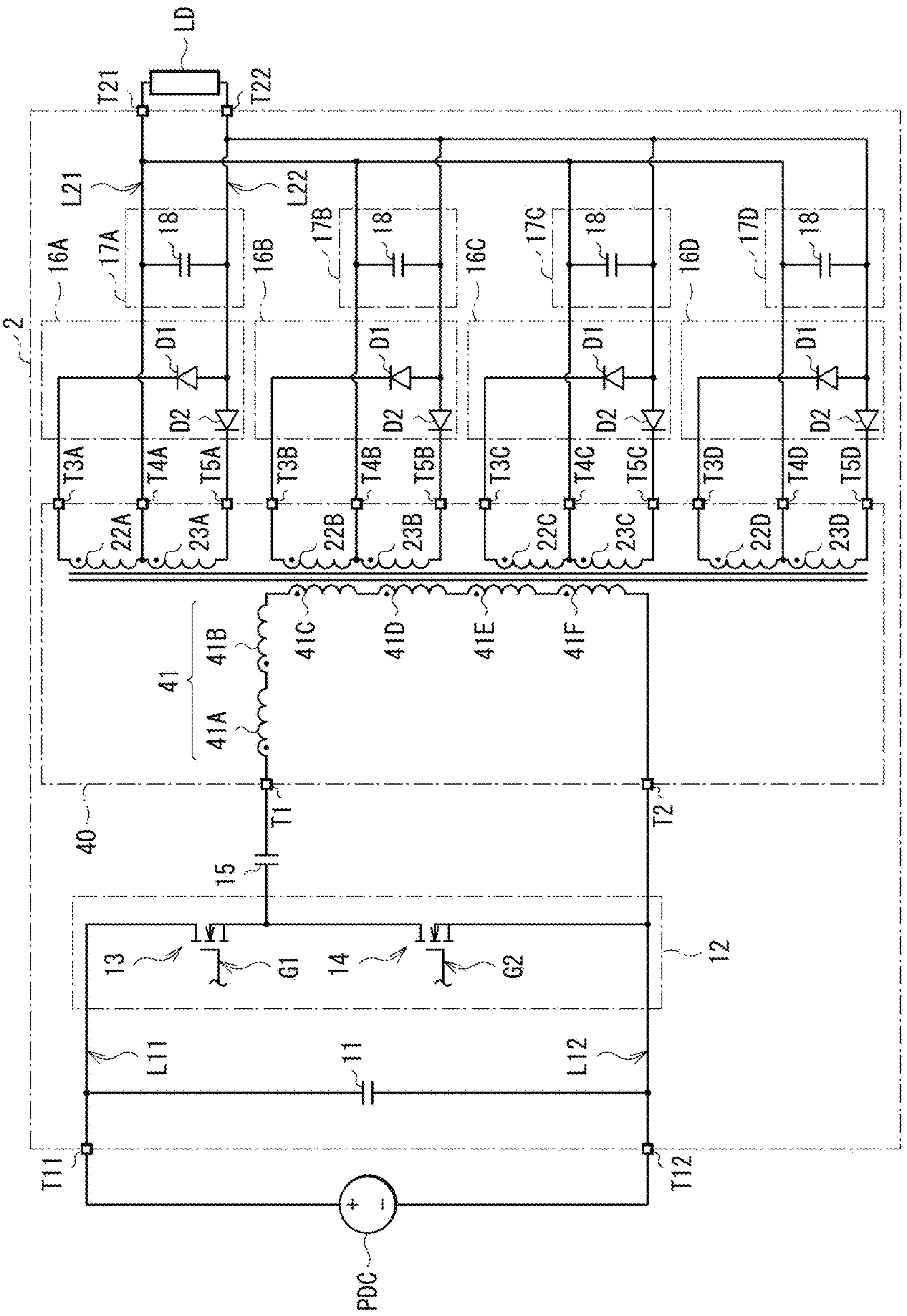
FIG. 16 is a circuit diagram illustrating a configuration example of a power conversion apparatus according to one example embodiment of the technology.

FIG. 16 illustrates a configuration example of the power conversion apparatus 2. The power conversion apparatus 2 includes a transformer 40. The transformer 40 includes a winding 41.

The winding 41 has one end coupled to the coupling terminal T1, and another end coupled to the coupling terminal T2. The winding 41 includes windings 41A, 41B, 41C, 41D, 41E, and 41F. The windings 41A and 41B constitute a resonant coil, and the windings 41C to 41F constitute a primary-side winding of the transformer. The windings 41A to 41F are coupled in series in this order. The winding 41A is coupled to the coupling terminal T1, and the winding 41F is coupled to the coupling terminal T2.

Figure 17:
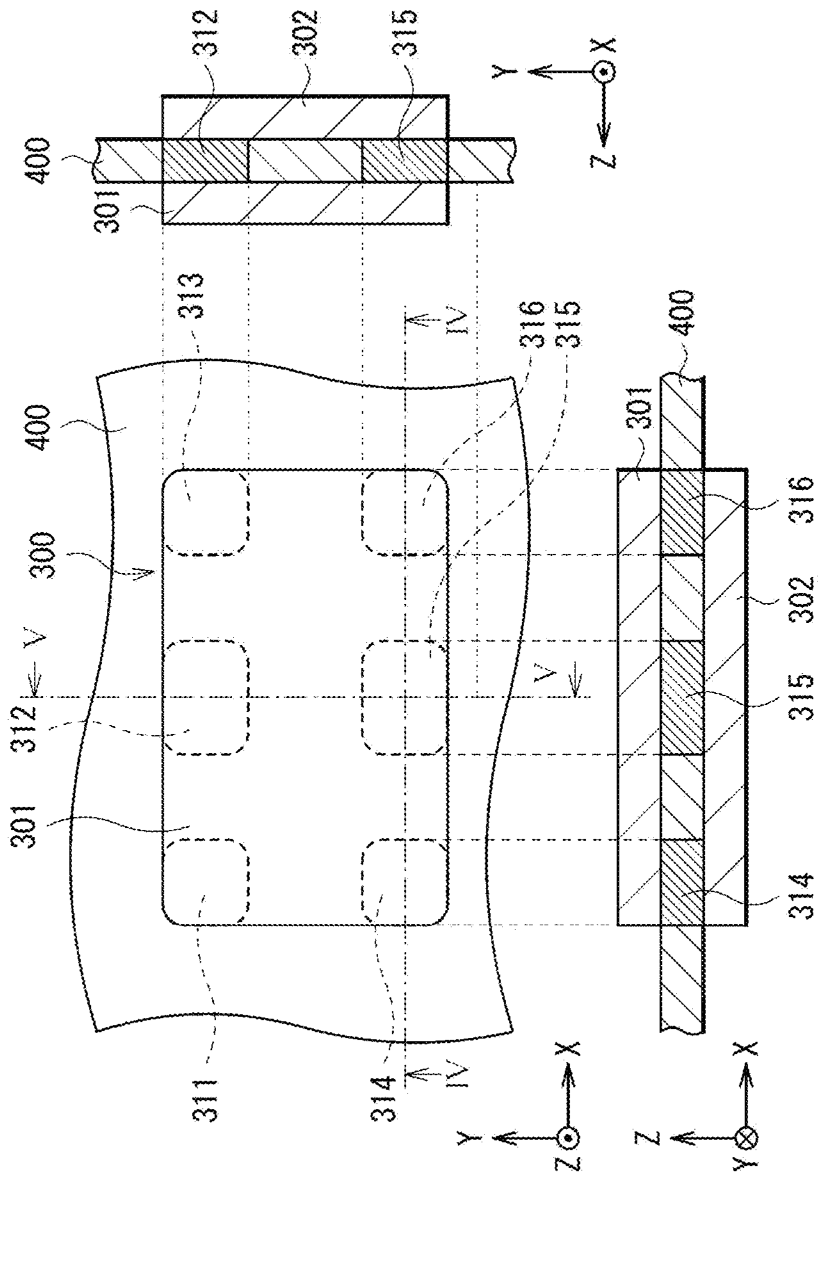
FIG. 17 is an explanatory diagram illustrating a configuration example of a transformer illustrated in FIG. 16.

FIG. 17 illustrates a configuration example of the transformer 40. FIG. 17 also illustrates a cross section of the transformer 40 as viewed in a direction of arrows IV-IV and a cross section of the transformer 40 as viewed in a direction of arrows V-V. The transformer 40 includes a magnetic core 300 and a substrate 400.

The magnetic core 300 includes base parts 301 and 302 and six leg parts 311 to 316. The base parts 301 and 302 are disposed to be opposed to each other in the Z direction. The base parts 301 and 302 each have a generally rectangular shape that is long in the X direction in the XY plane. The leg parts 311 to 316 are disposed within opposed surfaces of the two base parts 301 and 302 and are provided to magnetically couple the two base parts 301 and 302. The leg parts 311, 312, and 313 are arranged side by side in this order in the X direction. The leg parts 314, 315, and 316 are arranged side by side in this order in the X direction. The leg parts 311 and 314 are arranged side by side in the Y direction. The leg parts 312 and 315 are arranged side by side in the Y direction. The leg parts 313 and 316 are arranged side by side in the Y direction. In the XY plane, the leg parts 312 and 315 have cross-sectional areas greater than cross-sectional areas of the leg parts 311, 313, 314, and 316.

The substrate 400 is a multilayer substrate (a four-layer substrate in this example). The substrate 400 is provided with penetrating holes at positions corresponding to the leg parts 311 to 316 of the magnetic core 300. The substrate 400 is interposed between the base parts 301 and 302 of the magnetic core 300. The substrate 400 is provided with the winding 41, and the windings 22A, 23A, 22B, 23B, 22C, 23C, 22D, and 23D.

FIG. 18 illustrates a configuration example of the windings at the substrate 400. In FIG. 18, the winding 41 is illustrated in solid lines, and the windings 22A, 23A, 22B, 23B, 22C, 23C, 22D, and 23D are illustrated in broken lines.

The wiring layers LA2 and LA3 are each provided with the winding 41 (the windings 41A, 41B, 41C, 41D, 41E, and 41F). The substrate 400 is provided with through holes TH31 to TH37 coupling the wiring line of the wiring layer LA2 and the wiring line of the wiring layer LA3. The winding 41 includes these through holes TH31 to TH37 and is coupled to the coupling terminals T1 and T2. The winding 41 is wound around the six leg parts 311 to 316. Specifically, in the direction from the coupling terminal T1 to the coupling terminal T2, the winding 41 is wound clockwise around each of the leg parts 311, 313, and 315, and counterclockwise around each of the leg parts 312, 314, and 316. Portions of the winding 41 that are wound around the leg parts 311 and 316 correspond to the windings 41A and 41B which constitute the resonant coil. Portions of the winding 41 that are wound around the leg parts 312 to 315 correspond to the windings 41C to 41F which constitute the primary-side winding of the transformer.

The wiring layer LA1 is provided with the windings 22A, 22B, 22C, and 22D. In the direction from the coupling terminal T3A to the coupling terminal T4A, the winding 22A is wound counterclockwise once around the leg part 314. In the direction from the coupling terminal T3B to the coupling terminal T4B, the winding 22B is wound counterclockwise once around the leg part 312. In the direction from the coupling terminal T3C to the coupling terminal T4C, the winding 22C is wound clockwise once around the leg part 313. In the direction from the coupling terminal T3D to the coupling terminal T4D, the winding 22D is wound clockwise once around the leg part 315.

The wiring layer LA4 is provided with the windings 23A, 23B, 23C, and 23D. In the direction from the coupling terminal T5A to the coupling terminal T4A, the winding 23A is wound clockwise once around the leg part 314. In the direction from the coupling terminal T5B to the coupling terminal T4B, the winding 23B is wound clockwise once around the leg part 312. In the direction from the coupling terminal T5C to the coupling terminal T4C, the winding 23C is wound counterclockwise once around the leg part 313. In the direction from the coupling terminal T5D to the coupling terminal T4D, the winding 23D is wound counterclockwise once around the leg part 315.

Here, the transformer 40 corresponds to a specific example of the "magnetic component" in one embodiment of the disclosure. The magnetic core 300 corresponds to a specific example of the "magnetic core" in one embodiment of the disclosure. The leg part 311 corresponds to a specific example of the "first leg part" in one embodiment of the disclosure. The leg part 312 corresponds to a specific example of the "second leg part" in one embodiment of the disclosure. The leg part 313 corresponds to a specific example of the "third leg part" in one embodiment of the disclosure. The leg part 314 corresponds to a specific example of the "fourth leg part" in one embodiment of the disclosure. The leg part 315 corresponds to a specific example of the "fifth leg part" in one embodiment of the disclosure. The leg part 316 corresponds to a specific example of the "sixth leg part" in one embodiment of the disclosure. The winding 41 corresponds to a specific example of the "first winding" in one embodiment of the disclosure. The transformer 40 corresponds to a specific example of the "transformer" in one embodiment of the disclosure.

The switching circuit 12 of the power conversion apparatus 2 operates in a manner similar to the case of the foregoing first example embodiment (FIGS. 4, 5A, and 5B).

FIGS. 19A and 19B illustrate directions of magnetic flux at the leg parts 311 to 316 of the magnetic core 300. FIG. 19A illustrates the directions of magnetic flux at the timing tA, and FIG. 19B illustrates the directions of magnetic flux at the timing tB. FIGS. 20A and 20B illustrate directions of magnetic flux at the base part 301 of the magnetic core 300. FIG. 20A illustrates the directions of magnetic flux at the timing tA, and FIG. 20B illustrates the directions of magnetic flux at the timing tB.

As in the case of the foregoing first example embodiment (FIGS. 4 and 5A), during the period from the timing t1 to the timing t2, the transistor 13 is in the ON state and the transistor 14 is in the OFF state. As a result, at the certain timing tA during the period from the timing t1 to the timing t2, as illustrated in FIG. 5A, in the primary-side circuitry the current IA1 flows through the transistor 13, the capacitor 15, the coupling terminal T1, the winding 41, and the coupling terminal T2 in this order. In response to the current IA1, in the secondary-side circuitry pertaining to the rectifying circuit 16A and the smoothing circuit 17A, for example, the current IA2 flows through the winding 23A, the coupling terminal T4A, the capacitor 18 and the load LD, the diode D2, and the coupling terminal T5A in this order.

In this way, due to the current IA1 flowing through the winding 41 from the coupling terminal T1 to the coupling terminal T2, a magnetic flux is generated at each of the leg parts 311 to 316 in the transformer 40, as illustrated in FIG. 19A. Because the winding 41 is wound clockwise around each of the leg parts 311, 313, and 315, and counterclockwise around each of the leg parts 312, 314, and 316, the magnetic flux at each of the leg parts 311, 313, and 315 is in the direction opposite to the Z direction, and the magnetic flux at each of the leg parts 312, 314, and 316 is in the Z direction. At the base part 302, as illustrated in FIG. 20A, a magnetic flux that moves from the leg part 311 to the leg parts 312 and 314 is generated, a magnetic flux that moves from the leg part 315 to the leg parts 312, 314, and 316 is generated, and a magnetic flux that moves from the leg part 313 to the leg parts 312 and 316 is generated. Directions of magnetic flux at the base part 301 are opposite to the directions of magnetic flux at the base part 302 (FIG. 20A).

During the period from the timing t3 to the timing t4, as illustrated in FIGS. 4 and 5B, the transistor 13 is in the OFF state and the transistor 14 is in the ON state. As a result, at the certain timing tB during the period from the timing t3 to the timing t4, as illustrated in FIG. 5B, in the primary-side circuitry the current D31 flows through the capacitor 15, the transistor 14, the coupling terminal T2, the winding 41, and the coupling terminal T1 in this order. In response to the current IB1, in the secondary-side circuitry pertaining to the rectifying circuit 16A and the smoothing circuit 17A, for example, the current IA2 flows through the winding 22A, the coupling terminal T4A, the capacitor 18 and the load LD, the diode D2, and the coupling terminal T3A in this order.

In this way, due to the current IB1 flowing through the winding 41 from the coupling terminal T2 to the coupling terminal T1, a magnetic flux is generated at each of the leg parts 311 to 316 in the transformer 40, as illustrated in FIG. 19B. The magnetic flux at each of the leg parts 311, 313, and 315 is in the Z direction, and the magnetic flux at each of the leg parts 312, 314, and 316 is in the opposite direction to the Z direction. At the base part 302, as illustrated in FIG. 20B, a magnetic flux that moves from the leg part 312 to the leg parts 311, 313, and 315 is generated, a magnetic flux that moves from the leg part 314 to the leg parts 311 and 315 is generated, and a magnetic flux that moves from the leg part 316 to the leg parts 313 and 315 is generated. Directions of magnetic flux at the base part 301 are opposite to the directions of magnetic flux at the base part 302 (FIG. 20B).

The power conversion apparatus 2 repeats such operations to thereby transform direct-current electric power supplied from the direct-current power supply PDC and output the transformed direct-current electric power. The power conversion apparatus 2 controls the operations of the transistors 13 and 14 by using PWM to thereby control the output voltage to be constant.

In the power conversion apparatus 2, the six leg parts 311 to 316 are provided, the leg parts 311, 312, and 313 are arranged side by side in this order in the X direction, the leg parts 314, 315, and 316 are arranged side by side in this order in the X direction, the leg parts 311 and 314 are arranged side by side in the Y direction, the leg parts 312 and 315 are arranged side by side in the Y direction, and the leg parts 313 and 316 are arranged side by side in the Y direction. Further, in the direction from the coupling terminal T1 to the coupling terminal T2, the winding 41 is wound around the leg parts 311, 313, and 315 in the first winding direction, and around the leg parts 312, 314, and 316 in the second winding direction. As a result, in the transformer 40, as illustrated in FIGS. 20A and 20B, a magnetic flux in the first direction is generated at each of the leg parts 311, 313, and 315, and a magnetic flux in the second direction is generated at each of the leg parts 312, 314, and 316. Further, the magnetic flux is dispersed at the base parts 301 and 302. By dispersing the magnetic flux at the base parts 301 and 302 as described above, it is possible to reduce magnetic flux densities at the base parts 301 and 302. This makes it possible for the base parts 301 and 302 to be reduced in height in the Z direction. Further, by virtue of the provision of the six leg parts 311 to 316 as described above, it is possible to reduce the number of turns of the winding 41 at each of the leg parts 311 to 316, and it is thus possible to reduce the number of layers of the substrate 400, for example. This makes it possible for the leg parts 311 to 316 to be reduced in height in the Z direction. As a result, it is possible for the power conversion apparatus 2 to achieve a reduction in size of the transformer 40.

In the power conversion apparatus 2, the cross-sectional areas of the leg parts 312 and 315 are greater than the cross-sectional areas of the leg parts 311, 313, 314, and 316. This makes it possible to reduce magnetic flux densities at the leg parts 312 and 315. That is, as illustrated in FIGS. 20A and 20B, for example, at the leg part 311, there are formed magnetic paths pertaining to the two leg parts 312 and 314, whereas at the leg part 312, there are formed magnetic paths pertaining to the three leg parts 311, 313, and 315; therefore, magnetic flux is strong at the leg part 312. The same applies to the leg part 315. In the power conversion apparatus 2, because the cross-sectional areas of the leg parts 312 and 315 are greater than the cross-sectional areas of the leg parts 311, 313, 314, and 316, it is possible to reduce the magnetic flux densities at the leg parts 312 and 315.

Further, in the power conversion apparatus 2, the winding 41 is wound around the six leg parts 311 to 316, and the windings 22A, 23A, 22B, 23B, 22C, 23C, 22D, and 23D are wound around the four leg parts 312 to 315 other than the leg parts 311 and 316. This makes it possible to allow the portions of the winding 41 wound around the leg parts 311 and 316 to serve as a resonant coil. It is thus possible, in the transformer 40, to combine the resonant coil and the transformer. This allows for a reduction in size of the power conversion apparatus 2 as compared with a case where a resonant coil and a transformer are provided separately.

Further, according to the power conversion apparatus 2, because the resonant coil is configurable by winding the winding 41 around the two leg parts 311 and 316, it is possible to increase the inductance of the resonant coil. This allows for operation over a wide input voltage range. Further, because the resonant coil is wound around the leg parts 311 and 316 that are diagonally opposite to each other, in the power conversion apparatus 2, it is possible to disperse a large magnetic flux that moves from the leg part 311 having only the primary-side winding wound therearound to the leg part 316 having only the primary-side winding wound therearound through, for example, the base part 301 and returns from the leg part 316 to the leg part 311 through the base part 302 at timings at which the current I1 on the primary side becomes maximum (timings t6 and t7 in FIG. 4), for example. Accordingly, in the power conversion apparatus 2, it is possible to disperse a large magnetic flux generated by the resonant coil when the current at the resonant coil becomes maximum, and to thereby reduce the magnetic flux density. Further, the magnetic flux in the transformer 40 becomes maximum at timings at which the excitation current Im becomes maximum (the timings t0 and t2 in FIG. 4), for example. At this time, the current I2 does not flow on the secondary side, and the current I1 on the primary side causes a magnetic flux to occur at each of the six leg parts 311 to 316. It is possible to disperse the magnetic flux to the base parts 301 and 302, as illustrated in FIGS. 20A and 20B. As a result, it is possible to effectively reduce the size of the transformer 40.

As described above, in the present example embodiment, the six leg parts 311 to 316 are provided, the leg parts 311, 312, and 313 are arranged side by side in this order in the X direction, the leg parts 314, 315, and 316 are arranged side by side in this order in the X direction, the leg parts 311 and 314 are arranged side by side in the Y direction, the leg parts 312 and 315 are arranged side by side in the Y direction, and the leg parts 313 and 316 are arranged side by side in the Y direction. Further, in the direction from the coupling terminal T1 to the coupling terminal T2, the winding 41 is wound around the leg parts 311, 313, and 315 in the first winding direction, and around the leg parts 312, 314, and 316 in the second winding direction. This makes it possible to reduce the size of the transformer.

In the present example embodiment, the winding 41 is wound around the six leg parts 311 to 316, and the windings 22A, 23A, 22B, 23B, 22C, 23C, 22D, and 23D are wound around the four leg parts 312 to 315 other than the leg parts 311 and 316. This makes it possible for the power conversion apparatus to be reduced in size and to operate over a wide input voltage range.

Modification Example 2-1

Modification Examples 1-1 to 1-3 of the foregoing first example embodiment may be applied to the power conversion apparatus 2 according to the above example embodiment.

Modification Example 2-2

The transformer 40 of the above example embodiment may further include a heat sink, similarly to Modification Example 1-4 of the foregoing first example embodiment. A transformer 40D according to the present modification example will be described in detail below. The transformer 40D includes a magnetic core 300D, the substrate 400, and a heat sink 330.

FIG. 21 illustrates a configuration example of the transformer 40D, in which part (A) illustrates the magnetic core 300D, and part (B) illustrates the heat sink 330. Part (B) of FIG. 21 also illustrates a cross section of the heat sink 330 as viewed in a direction of arrows VI-VI.

The base parts 301 and 302 of the magnetic core 300D each have openings 321 and 322. The opening 321 is provided among the four leg parts 311, 312, 314, and 315, and has a generally rectangular shape. The opening 322 is provided among the leg parts 312, 313, 315, and 316, and has a generally rectangular shape. In this example, the openings 321 and 322 of the base part 302 are configured to respectively mate with projections 341 and 342 (described later) of the heat sink 330.

The heat sink 330 in this example includes six projections 332 to 335, 341, and 342. The projections 332 to 335, 341, and 342 each have a generally rectangular shape, and each have a height in the Z direction almost equal to the thickness of the base part 302, for example. The base part 302 of the magnetic core 300D mates with a region surrounded by the projections 332 to 335 of the heat sink 330. The projection 341 mates with the opening 321 of the base part 302. The projection 342 mates with the opening 322 of the base part 302. As a result, the projections 332 to 335, 341, and 342 of the heat sink 330 are thermally coupled to the substrate 400 of the magnetic core 300D.

Here, the magnetic core 300D corresponds to a specific example of the "magnetic core" in one embodiment of the disclosure. The opening 321 corresponds to a specific example of the "first opening" in one embodiment of the disclosure. The opening 322 corresponds to a specific example of the "second opening" in one embodiment of the disclosure. The projection 341 corresponds to a specific example of the "first projection" in one embodiment of the disclosure. The projection 342 corresponds to a specific example of the "second projection" in one embodiment of the disclosure.

Modification Example 2-3

For example, an air gap, a spacer gap, a gap sheet, or the like may be provided on magnetic coupling portions in some or all of the leg pats 311 to 316.

Other Modification Examples

Further, two or more of these modification examples may be combined.

The technology has been described hereinabove with reference to the example embodiments and the modification examples. However, the technology is not limited to the example embodiments, etc., and may be modified in a variety of ways.

Figure 22:
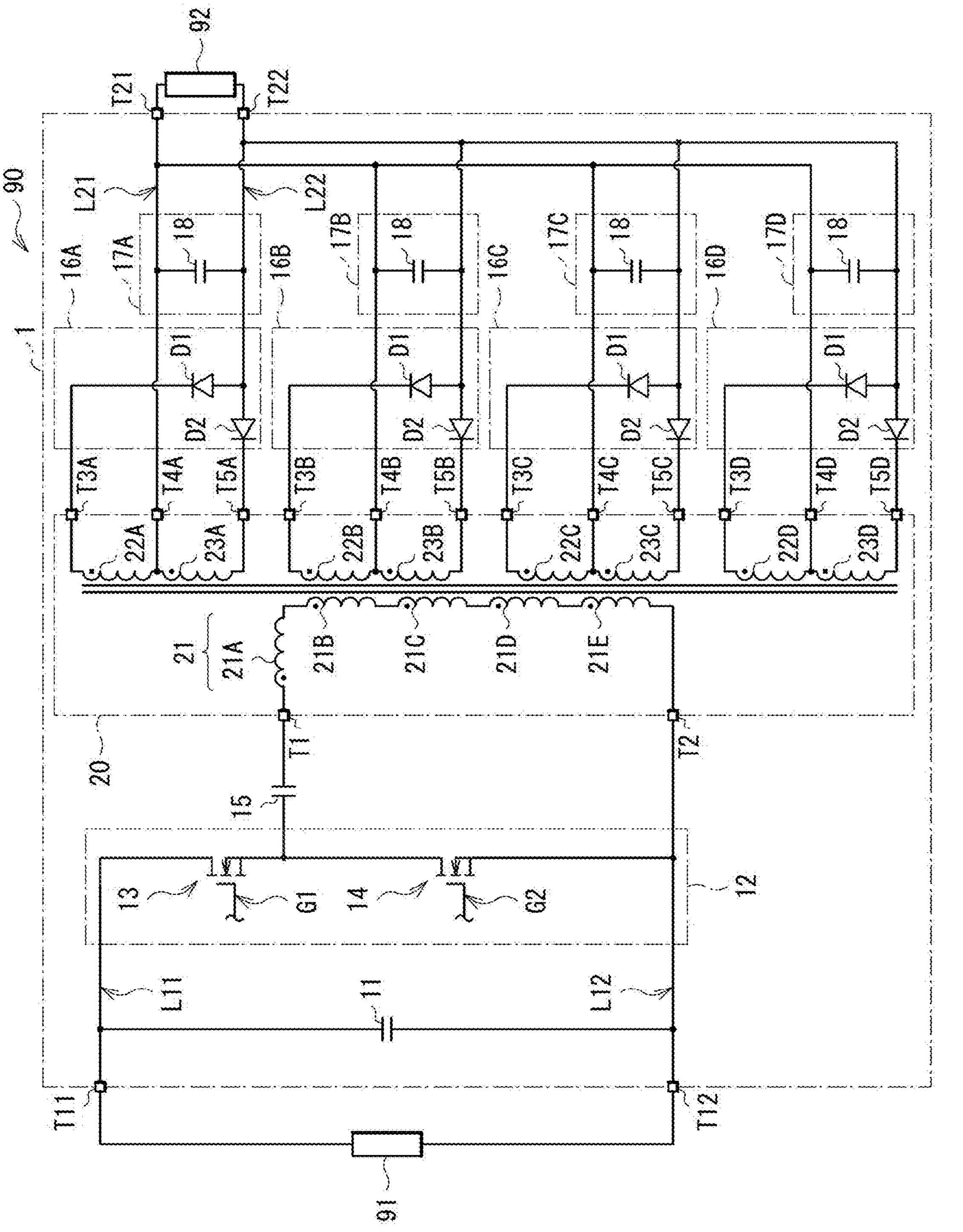
FIG. 22 is an explanatory diagram illustrating a configuration example of a power conversion system according to a modification example of one example embodiment of the technology.

For example, in the foregoing example embodiments, etc., direct-current electric power supplied from the direct-current power supply PDC is transformed and the transformed direct-current electric power is supplied to the load LD; however, this is non-limiting. Alternatively, as in a power conversion system 90 illustrated in FIG. 22, for example, batteries 91 and 92 may be provided and the power conversion apparatus 1 may transform direct-current electric power supplied form the battery 91 and supply the transformed direct-current electric power to the battery 92.

Embodiments of the technology may be configured as follows.

(1)

A magnetic component including:

a magnetic core including two base parts opposed to each other, and five leg parts disposed within opposed surfaces of the two base parts and magnetically coupling the two base parts, the five leg parts including a first leg part, a second leg part, a third leg part, a fourth leg part, and a fifth leg part, the second leg part and the third leg part being disposed with the first leg part interposed therebetween in a first direction, the fourth leg part and the fifth leg part being disposed with the first leg part interposed therebetween in a second direction;

a first coupling terminal and a second coupling terminal;

a first winding that is, in a direction from the first coupling terminal to the second coupling terminal, wound around the first leg part, the second leg part, and the third leg part in a first winding direction, and around the fourth leg part and the fifth leg part in a second winding direction; and one or multiple second windings wound around four of the five leg parts other than the first leg part.

(2)

The magnetic component according to (1), in which a cross-sectional area of the fourth leg part and a cross-sectional area of the fifth leg part are greater than a cross-sectional area of the second leg part and a cross-sectional area of the third leg part.

(3)

The magnetic component according to (1) or (2), in which a width of the fourth leg part and a width of the fifth leg part in the first direction are greater than a width of the second leg part and a width of the third leg part in the second direction.

(4)

The magnetic component according to any one of (1) to (3), in which a width of the first leg part in the first direction is greater than a width of the second leg part and a width of the third leg part in the second direction.

(5)

The magnetic component according to any one of (1) to (4), further including a heat sink, in which the two base parts include a first base part and a second base part, the first base part has a first opening provided between the first leg part and the second leg part, and a second opening provided between the first leg part and the third leg part, and the heat sink is attached to the first base part, and includes a first projection provided at a position corresponding to the first opening of the first base part and a second projection provided at a position corresponding to the second opening of the first base part.

(6)

A magnetic component including:

a magnetic core including two base parts opposed to each other, and six leg parts disposed within opposed surfaces of the two base parts and magnetically coupling the two base parts, the six leg parts including a first leg part, a second leg part, a third leg part, a fourth leg part, a fifth leg part, and a sixth leg part, the first leg part, the second leg part, and the third leg part being arranged side by side in this order in a first direction, the fourth leg part, the fifth leg part, and the sixth leg part being arranged side by side in this order in the first direction, the first leg part and the fourth leg part being arranged side by side in a second direction, the second leg part and the fifth leg part being arranged side by side in the second direction, the third leg part and the sixth leg part being arranged side by side in the second direction;

a first coupling terminal and a second coupling terminal;

a first winding that is, in a direction from the first coupling terminal to the second coupling terminal, wound around the first leg part, the third leg part, and the fifth leg part in a first winding direction, and around the second leg part, the fourth leg part, and the sixth leg part in a second winding direction; and one or multiple second windings wound around four of the six leg parts other than the first leg part and the sixth leg part.

(7)

The magnetic component according to (6), in which a cross-sectional area of the second leg part and a cross-sectional area of the fifth leg part are greater than a cross-sectional area of the first leg part, a cross-sectional area of the third leg part, a cross-sectional area of the fourth leg part, and a cross-sectional area of the sixth leg part.

(8)

The magnetic component according to (6) or (7), further including a heat sink, in which the two base parts include a first base part and a second base part, the first base part has a first opening provided among the first leg part, the second leg part, the fourth leg part, and the fifth leg part, and a second opening provided among the second leg part, the third leg part, the fifth leg part, and the sixth leg part, and the heat sink is attached to the first base part, and includes a first projection provided at a position corresponding to the first opening of the first base part and a second projection provided at a position corresponding to the second opening of the first base part.

(9)

A power conversion apparatus including:

the magnetic component according to any one of (1) to (8);

a switching circuit coupled to at least one of the first coupling terminal or the second coupling terminal of the magnetic component, and including one or multiple switching devices;

a rectifying circuit coupled to the one or multiple second windings of the magnetic component; and a smoothing circuit coupled to the rectifying circuit.

(10)

A power conversion apparatus including:

the magnetic component according to any one of (1) to (8);

a switching circuit coupled to the one or multiple second windings of the magnetic component, and including one or multiple switching devices;

a rectifying circuit coupled to the first coupling terminal and the second coupling terminal of the magnetic component; and a smoothing circuit coupled to the rectifying circuit.

(11)

A power conversion system including:

the power conversion apparatus according to (9) or (10);

a first battery coupled to the switching circuit of the power conversion apparatus; and a second battery coupled to the smoothing circuit of the power conversion apparatus.

The magnetic component, the power conversion apparatus, and the power conversion system according to the respective embodiments of the technology each make it possible to achieve a size reduction.

This application claims priority from Japanese Patent Application No. 2020-052502 filed with the Japan Patent Office on Mar. 24, 2020, the entire contents of which are incorporated herein by reference.

The invention claimed is:

1. A magnetic component comprising:

a magnetic core including two base parts opposed to each other, and five leg parts disposed within opposed surfaces of the two base parts and magnetically coupling the two base parts, the five leg parts including a first leg part, a second leg part, a third leg part, a fourth leg part, and a fifth leg part, the second leg part and the third leg part being disposed with the first leg part interposed therebetween in a first direction, the fourth leg part and the fifth leg part being disposed with the first leg part interposed therebetween in a second direction;

a first coupling terminal and a second coupling terminal;

a first winding that is, in a direction from the first coupling terminal to the second coupling terminal, wound around the first leg part, the second leg part, and the third leg part in a first winding direction, and around the fourth leg part and the fifth leg part in a second winding direction; and one or multiple second windings wound around four of the five leg parts other than the first leg part.

2. The magnetic component according to claim 1, wherein a cross-sectional area of the fourth leg part and a cross-sectional area of the fifth leg part are greater than a cross-sectional area of the second leg part and a cross-sectional area of the third leg part.

3. The magnetic component according to claim 1, wherein a width of the fourth leg part and a width of the fifth leg part in the first direction are greater than a width of the second leg part and a width of the third leg part in the second direction.

4. The magnetic component according to claim 1, wherein a width of the first leg part in the first direction is greater than a width of the second leg part and a width of the third leg part in the second direction.

5. The magnetic component according to claim 1, further comprising a heat sink, wherein the two base parts include a first base part and a second base part, the first base part has a first opening provided between the first leg part and the second leg part, and a second opening provided between the first leg part and the third leg part, and the heat sink is attached to the first base part, and includes a first projection provided at a position corresponding to the first opening of the first base part and a second projection provided at a position corresponding to the second opening of the first base part.

6. A magnetic component comprising:

a magnetic core including two base parts opposed to each other, and six leg parts disposed within opposed surfaces of the two base parts and magnetically coupling the two base parts, the six leg parts including a first leg part, a second leg part, a third leg part, a fourth leg part, a fifth leg part, and a sixth leg part, the first leg part, the second leg part, and the third leg part being arranged side by side in this order in a first direction, the fourth leg part, the fifth leg part, and the sixth leg part being arranged side by side in this order in the first direction, the first leg part and the fourth leg part being arranged side by side in a second direction, the second leg part and the fifth leg part being arranged side by side in the second direction, the third leg part and the sixth leg part being arranged side by side in the second direction;

a first coupling terminal and a second coupling terminal;

a first winding that is, in a direction from the first coupling terminal to the second coupling terminal, wound around the first leg part, the third leg part, and the fifth leg part in a first winding direction, and around the second leg part, the fourth leg part, and the sixth leg part in a second winding direction; and one or multiple second windings wound around four of the six leg parts other than the first leg part and the sixth leg part.

7. The magnetic component according to claim 6, wherein a cross-sectional area of the second leg part and a cross-sectional area of the fifth leg part are greater than a cross-sectional area of the first leg part, a cross-sectional area of the third leg part, a cross-sectional area of the fourth leg part, and a cross-sectional area of the sixth leg part.

8. The magnetic component according to claim 6, further comprising a heat sink, wherein the two base parts include a first base part and a second base part, the first base part has a first opening provided among the first leg part, the second leg part, the fourth leg part, and the fifth leg part, and a second opening provided among the second leg part, the third leg part, the fifth leg part, and the sixth leg part, and the heat sink is attached to the first base part, and includes a first projection provided at a position corresponding to the first opening of the first base part and a second projection provided at a position corresponding to the second opening of the first base part.

9. A power conversion apparatus comprising:

the magnetic component according to claim 1;

a switching circuit coupled to at least one of the first coupling terminal or the second coupling terminal of the magnetic component, and including one or multiple switching devices;

a rectifying circuit coupled to the one or multiple second windings of the magnetic component; and a smoothing circuit coupled to the rectifying circuit.

10. A power conversion apparatus comprising:

the magnetic component according to claim 1;

a switching circuit coupled to the one or multiple second windings of the magnetic component, and including one or multiple switching devices;

a rectifying circuit coupled to the first coupling terminal and the second coupling terminal of the magnetic component; and a smoothing circuit coupled to the rectifying circuit.

11. A power conversion system comprising:

the power conversion apparatus according to claim 9;

a first battery coupled to the switching circuit of the power conversion apparatus; and a second battery coupled to the smoothing circuit of the power conversion apparatus.

12. A power conversion system comprising:

the power conversion apparatus according to claim 10;

a first battery coupled to the switching circuit of the power conversion apparatus; and a second battery coupled to the smoothing circuit of the power conversion apparatus.

13. A power conversion apparatus comprising:

the magnetic component according to claim 6;

a switching circuit coupled to at least one of the first coupling terminal or the second coupling terminal of the magnetic component, and including one or multiple switching devices;

a rectifying circuit coupled to the one or multiple second windings of the magnetic component; and a smoothing circuit coupled to the rectifying circuit.

14. A power conversion apparatus comprising:

the magnetic component according to claim 6;

a switching circuit coupled to the one or multiple second windings of the magnetic component, and including one or multiple switching devices;

a rectifying circuit coupled to the first coupling terminal and the second coupling terminal of the magnetic component; and a smoothing circuit coupled to the rectifying circuit.

15. A power conversion system comprising:

the power conversion apparatus according to claim 13;

a first battery coupled to the switching circuit of the power conversion apparatus; and a second battery coupled to the smoothing circuit of the power conversion apparatus.

16. A power conversion system comprising:

the power conversion apparatus according to claim 14;

a first battery coupled to the switching circuit of the power conversion apparatus; and a second battery coupled to the smoothing circuit of the power conversion apparatus.

* * * * *